(12) United States Patent
Chang et al.

(10) Patent No.: US 11,480,758 B2
(45) Date of Patent: *Oct. 25, 2022

(54) OPTICAL IMAGE CAPTURING SYSTEM

(71) Applicant: Ability Opto-Electronics Technology Co., Ltd., Taichung (TW)

(72) Inventors: Yeong-Ming Chang, Taichung (TW); Chien-Hsun Lai, Taichung (TW); Yao-Wei Liu, Taichung (TW)

( * ) Notice: Subject to any disclaimer, the term of this patent is extended or adjusted under 35 U.S.C. 154(b) by 309 days.

This patent is subject to a terminal disclaimer.

(21) Appl. No.: 16/841,644

(22) Filed: Apr. 6, 2020

(65) Prior Publication Data

US 2021/0239943 A1 Aug. 5, 2021

(30) Foreign Application Priority Data

Jan. 30, 2020 (TW) ................................ 109102746

(51) Int. Cl.
*G02B 9/60* (2006.01)
*G02B 13/00* (2006.01)
*H04N 5/225* (2006.01)

(52) U.S. Cl.
CPC ........... *G02B 9/60* (2013.01); *G02B 13/0045* (2013.01); *H04N 5/2254* (2013.01)

(58) Field of Classification Search
None
See application file for complete search history.

(56) References Cited

U.S. PATENT DOCUMENTS

| | | | | |
|---|---|---|---|---|
| 9,645,357 B2 * | 5/2017 | Liu | ........................... | G02B 9/62 |
| 9,645,358 B2 * | 5/2017 | Liu | .................... | G02B 13/0045 |
| 9,645,359 B2 * | 5/2017 | Liu | ........................... | G02B 9/62 |
| 9,684,150 B2 * | 6/2017 | Liu | ........................... | G02B 9/60 |
| 9,709,777 B2 * | 7/2017 | Liu | .................... | G02B 13/0045 |
| 9,746,643 B2 * | 8/2017 | Liu | .................... | G02B 13/0045 |
| 9,778,442 B2 * | 10/2017 | Tang | ........................ | G02B 9/64 |
| 9,823,444 B2 * | 11/2017 | Liu | .................... | G02B 27/0025 |
| 9,857,560 B2 * | 1/2018 | Liu | .................... | G02B 13/0045 |

(Continued)

FOREIGN PATENT DOCUMENTS

| | | |
|---|---|---|
| TW | 201903459 A | 1/2019 |
| TW | 201939090 A | 10/2019 |
| TW | M598410 U | 7/2020 |

OTHER PUBLICATIONS

Search report for TW109102746, dated Feb. 25, 2022, Total of 1 page.

(Continued)

*Primary Examiner* — Darryl J Collins
(74) *Attorney, Agent, or Firm* — Apex Juris, PLLC; Hilde Coeckx

(57) ABSTRACT

The invention discloses a five-piece optical lens for capturing image and a five-piece optical module for capturing image. In order from an object side to an image side, the optical lens along the optical axis comprises a first lens with refractive power; a second lens with refractive power; a third lens with refractive power; a fourth lens with refractive power; a fifth lens with refractive power; and at least one of the image-side surface and object-side surface of each of the five lens elements is aspheric. The optical lens can increase aperture value and improve the imaging quality for use in compact cameras.

24 Claims, 9 Drawing Sheets

(56) References Cited

U.S. PATENT DOCUMENTS

| | | | |
|---|---|---|---|
| 9,958,644 B2* | 5/2018 | Liu | G02B 13/0045 |
| 9,958,649 B2* | 5/2018 | Lai | G02B 13/0045 |
| 9,964,737 B2* | 5/2018 | Tang | G02B 27/646 |
| 10,241,304 B2* | 3/2019 | Chang | G02B 13/04 |
| 10,338,345 B2* | 7/2019 | Lai | G02B 13/0045 |
| 10,416,415 B2* | 9/2019 | Lai | G02B 9/60 |
| 10,437,014 B2* | 10/2019 | Lai | G02B 13/18 |
| 10,690,883 B2* | 6/2020 | Chang | G02B 27/0037 |
| 11,137,572 B2* | 10/2021 | Chang | G02B 5/208 |
| 2019/0107691 A1 | 4/2019 | Song | |

OTHER PUBLICATIONS

English abstract for TW201903459, Total of 1 page.
English abstract for TW201939090, Total of 1 page.
English abstract for TWM598410, Total of 1 page.

* cited by examiner

OPTICAL IMAGE CAPTURING SYSTEM

BACKGROUND OF THE INVENTION

1. Field of the Invention

The present disclosure relates to an optical image capturing system, and more particularly to a compact optical image capturing system which can be applied to electronic products.

2. Description of the Prior Art

In recent years, with the rise of portable electronic devices having camera functionalities, the demand for an optical image capturing system gradually increased. The image sensing devices of ordinary optical systems are commonly selected from charge coupled devices (CCD) or complementary metal-oxide semiconductor sensors (CMOS sensors). As advanced semiconductor manufacturing technology enables the miniaturization of pixel sizes of the image sensing device, the development of optical image capturing systems has been directed towards developing systems with high pixel counts, thereby increasing the demand on image quality.

Traditional optical image capturing systems of a portable electronic device mainly comprise a three-lens or four-lens design structure. However, pixel counts of portable devices continue to increase, and end users require large apertures to fulfill functionalities such as micro filming and night filming. Thus, optical image capturing systems in prior arts cannot meet higher level filming requirements.

Therefore, how to effectively increase an amount of admitted light for lenses of the optical image capturing system and further increase corresponding image quality has become a pressing issue.

SUMMARY OF THE INVENTION

An aspect of an embodiment of the present disclosure directs to an optical image capturing system and an optical image capturing lens which use combinations of refractive powers of five pieces of optical lenses along with convex and concave surfaces of the five pieces of optical lenses (the convex or concave surface in the disclosure denotes the geometrical shape of an image-side surface or an object-side surface of each lens at different height from an optical axis) to further increase an amount of admitted light into the optical image capturing system and improve an image quality for image formation, so as to be applied to miniaturized electronic products.

The terminologies together with their numerals for the lens parameters related to the embodiment of the present disclosure are provided in the following paragraphs for reference in subsequent descriptions:

Lens Parameters Related to Length or Height of the Lens

An image height for image formation of the optical image capturing system is denoted as HOI. A height of the optical image capturing system is denoted as HOS. A distance from an object-side surface of the first lens to an image-side surface of the fifth lens is denoted as InTL. A distance from an aperture stop (aperture) to an image plane is denoted as InS. A distance from the first lens to the second lens is denoted as IN12 (for example). A central thickness of the first lens of the optical image capturing system on the optical axis is denoted as TP1 (for example).

Lens Parameters Related to a Material of the Lens

An Abbe number (dispersion coefficient) of the first lens in the optical image capturing system is denoted as NA1 (for example). A refractive index of the first lens is denoted as Nd1 (for example).

Lens Parameters Related to an Angle of View of the Lens

Angle of view is denoted as AF. Half of the angle of view is denoted as HAF. A major light angle is denoted as MRA.

Lens Parameters Related to Exit/Entrance Pupil in the Lens

An entrance pupil diameter of the optical image capturing system is denoted as HEP. An exit pupil of the optical image capturing system is the image formed in the image space after light passes through the lens assembly behind the aperture stop, and the exit pupil diameter is denoted as HXP. The maximum effective half diameter (EHD) of any surface of a single lens refers to a vertical height between the optical axis and an intersection point, where an incident ray with a maximum angle of view of the system passes through the outermost edge of an entrance pupil and intersects the surface of the lens. For example, the maximum effective half diameter of the object-side surface of the first lens is denoted as EHD11. The maximum effective half diameter of the image-side surface of the first lens is denoted as EHD12. The maximum effective half diameter of the object-side surface of the second lens is denoted as EHD21. The maximum effective half diameter of the image-side surface of the second lens is denoted as EHD22. Maximum effective half diameters of any surface of other lenses in the optical image capturing system are denoted according to the regular pattern shown above.

Lens Parameters Related to a Depth of the Lens Shape

A horizontal shift distance from an intersection point of the object-side surface of the fifth lens and the optical axis to a maximum effective half diameter position of the object-side surface of the fifth lens is denoted as InRS51 (depth at maximum effective half diameter). A horizontal shift distance from an intersection point of the image-side surface of the fifth lens and the optical axis to a maximum effective half diameter position of the image-side surface of the fifth lens is denoted as InRS52 (depth at maximum effective half diameter). Depth at maximum effective half diameter (sinkage value) of the object-side surface or image-side surface of other lenses in the optical image capturing system are denoted according to the regular pattern shown above.

Lens Parameters Related to the Lens Shape

A critical point C is a point on a surface of a specific lens, where a tangent plane to the surface at that point is perpendicular to the optical axis, and the point cannot be an intersection point with the optical axis on that specific surface of the lens. In addition, a perpendicular distance between a critical point C41 on the object-side surface of the fourth lens and the optical axis is denoted as HVT41 (for example). A perpendicular distance between a critical point C42 on the image-side surface of the fourth lens and the optical axis is denoted as HVT42 (for example). A perpendicular distance between a critical point C51 on the object-side surface of the fifth lens and the optical axis is denoted as HVT51 (for example). A perpendicular distance between a critical point C52 on the image-side surface of the fifth lens and the optical axis is denoted as HVT52 (for example). Perpendicular distances between a critical point on the object-side surface or image-side surface of other lenses are denoted according to the regular pattern shown above.

An inflection point on the object-side surface of the fifth lens and nearest to the optical axis is denoted as IF511, wherein a sinkage value of the inflection point IF511 is denoted as SGI511 (for example). The sinkage value SGI511 is a horizontal shift distance paralleling the optical axis, which is from an intersection point of the optical axis and the object-side surface of the fifth lens to an inflection point nearest to the optical axis on the object-side surface of the fifth lens. A distance perpendicular to the optical axis between the inflection point IF511 and the optical axis is denoted as HIF511 (for example). An inflection point on the image-side surface of the fifth lens which is nearest to the optical axis is denoted as IF521, and a sinkage value of the inflection point IF521 is denoted as SGI521 (for example). The sinkage value SGI521 is a horizontal shift distance paralleling the optical axis, which is from the intersection point of the optical axis and the image-side surface of the fifth lens to the inflection point nearest to the optical axis on the image-side surface of the fifth lens. A distance perpendicular to the optical axis between the inflection point IF521 and the optical axis is denoted as HIF521 (for example).

The object-side surface of the fifth lens has an inflection point IF512 which is the second nearest to the optical axis and a sinkage value of the inflection point IF512 is denoted as SGI512 (for example). The sinkage value SGI512 is a horizontal shift distance paralleling the optical axis from an intersection point of the optical axis and the object-side surface of the fifth lens to the inflection point which is the second nearest to the optical axis on the object-side surface of the fifth lens. A distance perpendicular to the optical axis between the inflection point IF512 and the optical axis is denoted as HIF512 (for example). The image-side surface of the fifth lens has an inflection point IF522 which is the second nearest to the optical axis and a sinkage value of the inflection point IF522 is denoted as SGI522 (for example). The sinkage value SGI522 is a horizontal shift distance paralleling the optical axis from an intersection point of the optical axis and the image-side surface of the fifth lens to the inflection point which is second nearest to the optical axis on the image-side surface of the fifth lens. A distance perpendicular to the optical axis between the inflection point IF522 and the optical axis is denoted as HIF522 (for example).

The object-side surface of the fifth lens has an inflection point IF513 which is the third nearest to the optical axis, and a sinkage value of the inflection point IF513 is denoted as SGI513 (for example). The sinkage value SGI513 is a horizontal shift distance paralleling the optical axis from an intersection point of the optical axis and the object-side surface of the fifth lens to the inflection point which is the third nearest to the optical axis on the object-side surface of the fifth lens. A distance perpendicular to the optical axis between the inflection point IF513 and the optical axis is denoted as HIF513 (example). The image-side surface of the fifth lens has an inflection point IF523 which is the third nearest to the optical axis, and a sinkage value of the inflection point IF523 is denoted as SGI523 (example). The sinkage value SGI523 is a horizontal shift distance paralleling the optical axis from an intersection point of the optical axis and the image-side surface of the fifth lens to the inflection point which is the third nearest to the optical axis on the image-side surface of the fifth lens. A distance perpendicular to the optical axis between the inflection point IF523 and the optical axis is denoted as HIF523 (for example).

The object-side surface of the fifth lens has an inflection point IF514 which is the fourth nearest to the optical axis and a sinkage value of the inflection point IF514 is denoted as SGI514 (for example). The sinkage value SGI514 is a horizontal shift distance paralleling the optical axis from an intersection point of the optical axis and the object-side surface of the fifth lens to the inflection point which is the fourth nearest to the optical axis on the object-side surface of the fifth lens. A distance perpendicular to the optical axis between the inflection point IF514 and the optical axis is denoted as HIF514 (for example). The image-side surface of the fifth lens has an inflection point IF524 which is the fourth nearest to the optical axis and a sinkage value of the inflection point IF524 is denoted as SGI524 (for example). The sinkage value SGI524 is a horizontal shift distance paralleling the optical axis from an intersection point of the optical axis and the image-side surface of the fifth lens to the inflection point which is the fourth nearest to the optical axis on the image-side surface of the fifth lens. A distance perpendicular to the optical axis between the inflection point IF524 and the optical axis is denoted as HIF524 (example).

Inflection points on the object-side surface or the image-side surface of other lenses and perpendicular distances between them and the optical axis, or sinkage values thereof are denoted according to the regular patterns shown above.

Lens Parameters Related to Aberration

Optical distortion for image formation in the optical image capturing system is denoted as ODT. TV distortion for image formation in the optical image capturing system is denoted as TDT. Additionally, degree of aberration offset within a range of 50% to 100% field of view of the formed image may be further illustrated. An offset of spherical aberration is denoted as DFS. An offset of coma aberration is denoted as DFC.

A characteristic diagram of a Modulation Transfer Function (MTF) of the optical image capturing system is utilized to test and assess the contrast and sharpness of image formation by the system. The vertical coordinate axis of the characteristic diagram of modulation transfer function represents a contrast transfer rate (values are from 0 to 1). The horizontal coordinate axis represents a spatial frequency (cycles/mm; lp/mm; line pairs per mm). Theoretically, an ideal optical image capturing system may present 100% of a line contrast of a photographed object. However, the values of the contrast transfer rate at the vertical coordinate axis are less than 1 in actual image capturing systems. In addition, in comparison with the central region, it is generally more difficult to achieve a fine recovery in the peripheral region of image formation. The contrast transfer rates (values of MTF) of spatial frequency of 55 cycles/mm at positions of the optical axis, 0.3 field of view and 0.7 field of view of a visible light spectrum on the image plane are respectively denoted as MTFE0, MTFE3 and MTFE7. The contrast transfer rates (values of MTF) of spatial frequency of 110 cycles/mm at the optical axis, 0.3 field of view and 0.7 field of view on the image plane are respectively denoted as MTFQ0, MTFQ3 and MTFQ7. The contrast transfer rates (values of MTF) of spatial frequency of 220 cycles/mm at the optical axis, 0.3 field of view and 0.7 field of view on the image plane are respectively denoted as MTFH0, MTFH3 and MTFH7. The contrast transfer rates (values of MTF) of spatial frequency of 440 cycles/mm at the optical axis, 0.3 field of view and 0.7 field of view on the image plane are respectively denoted as MTF0, MTF3 and MTF7. The three fields of view described above represent a center, an inner field of view and an outer field of view of the lenses. Thus, they may be utilized to evaluate whether the performance of a specific optical image capturing system is excellent. If the optical image capturing system of the present disclosure is designed to comprise the image sensing device with below 1.12 micrometers inclusive in correspondence with the pixel size, the quarter spatial frequency, the half spatial frequency (half frequency) and the full spatial frequency (full frequency) of the characteristic diagram of modulation transfer function are respectively at least 110 cycles/mm, 220 cycles/mm and 440 cycles/mm.

If an optical image capturing system is simultaneously required to capture image with infrared spectrum, such as for the purpose of night vision in a low light source condition, the operation wavelength thereof may be 850 nm or 800 nm. Since the main function of night vision is to recognize silhouette of an object formed in monochrome and shade, high resolution is not essential, and thus, a spatial frequency which is less than 110 cycles/mm may be merely selected for evaluating whether performance of a specific optical image capturing system is excellent when the optical image capturing system is applied to the infrared spectrum. When the aforementioned wavelength of 850 nm is focused on the image plane, the contrast transfer rates (values of MTF) with a spatial frequency of 55 cycles/mm at positions of the optical axis, 0.3 field of view and 0.7 field of view on the image plane are denoted as MTFI0, MTFI3 and MTFI7, respectively. However, since the difference between infrared wavelength as 850 nm or 800 nm and general wavelength of visible light is large, it may be difficult to design an optical image capturing system which is capable of focusing on the visible light and the infrared light simultaneously (dual-mode) while achieving certain performance in their respective wavelength range.

The disclosure provides an optical image capturing system, wherein the object-side surface or the image-side surface of the fifth lens thereof is configured with inflection points, such that the angle of incidence from each field of view to the fifth lens may be adjusted effectively, and in particular, the optical distortion as well as the TV distortion may also be corrected. Additionally, the surfaces of the fifth lens may possess a better capability for adjusting the optical path, so as to enhance image quality.

An optical image capturing system is provided in accordance with the present disclosure. In sequence from an object side to an image side, a first lens, a second lens, a third lens, a fourth lens, a fifth lens, and an image plane are included. The first lens is made of glass materials. At least one of the second through the fifth lens is made of plastic materials. At least one of the first lens through the fifth lens has positive refractive power. Focal lengths of the first, second, third, fourth and fifth lenses are f1, f2, f3, f4 and f5 respectively. The focal length of the optical image capturing system is f. The entrance pupil diameter of the optical image capturing system is HEP. The distance on the optical axis from an object-side surface of the first lens to the image plane is HOS. A distance from the object-side surface of the first lens to the image-side surface of the fifth lens is denoted as InTL. A maximum image height on the first image plane and perpendicular to the optical axis of the optical image capturing system is HOI. A thicknesses at ½ HEP height and parallel to the optical axis of the first lens, the second lens, the third lens, the fourth lens and the fifth lens are denoted as ETP1, ETP2, ETP3, ETP4 and ETP5 respectively, wherein the sum of the ETP1 to ETP5 described above is denoted as SETP. The thicknesses on the optical axis of the first lens, the second lens, the third lens, the fourth lens and the fifth lens are denoted as TP1, TP2, TP3, TP4 and TP5 respectively, wherein the sum of the TP1 to TP5 described above is denoted as STP. Conditions as follows are satisfied: $1.0 \leq f/HEP \leq 10$, $0.5 \leq HOS/f \leq 3$, and $0.5 \leq SETP/STP < 1$.

Another optical image capturing system is further provided in accordance with the present disclosure. In sequence from an object side to an image side, a first lens, a second lens, a third lens, a fourth lens, a fifth lens, and an image plane are included. The first lens is made of glass materials, and the first lens has a flat object-side surface and a flat image-side surface. At least one of the second through the fifth lens is made of plastic materials. Focal lengths of the first, second, third, fourth and fifth lenses are f1, f2, 3, f4 and f5 respectively. The focal length of the optical image capturing system is f. The entrance pupil diameter of the optical image capturing system is HEP. The distance on the optical axis from an object-side surface of the first lens to the image plane is HOS. A distance from the object-side surface of the first lens to the image-side surface of the fifth lens is denoted as InTL. A horizontal distance parallel to the optical axis between a coordinate point at ½ HEP height on the object-side surface of the first lens to the image plane is denoted as ETL. A horizontal distance parallel to the optical axis between a coordinate point at ½ HEP height on the object-side surface of the first lens to a coordinate point at ½ HEP height on the image-side surface of the fifth lens is denoted as EIN. Conditions as follows are satisfied: $1.0 \leq f/HEP \leq 10$, $0.5 \leq HOS/f \leq 3$, and $0.2 \leq EIN/ETL < 1$.

In addition, another optical image capturing system is further provided in accordance with the present disclosure. In sequence from an object side to an image side, a light admitting opening, a first lens, a second lens, a third lens, a fourth lens, a fifth lens, and an image plane are included. Wherein, the light admitting opening is configured to limit an optical path from the object side, and the light admitting opening has a diameter denoted as DDH. The first lens is made of glass materials, and the first lens has a flat object-side surface and a flat image-side surface. Focal lengths of the first, second, third, fourth and fifth lenses are f1, f2, f3, f4 and f5 respectively. The focal length of the optical image capturing system is f. The entrance pupil diameter of the optical image capturing system is HEP. The distance on the optical axis from an object-side surface of the first lens to the image plane is HOS. A distance from the object-side surface of the first lens to the image-side surface of the fifth lens is denoted as InTL. The maximum height of image on the image plane perpendicular to the optical axis of the optical image capturing system is HOI. A horizontal distance parallel to the optical axis between a coordinate point at ½ HEP height on the object-side surface of the first lens to the image plane is denoted as ETL. A horizontal distance parallel to the optical axis between a coordinate point at ½ HEP height on the object-side surface of the first lens to a coordinate point at ½ HEP height on the image-side surface of the fifth lens is denoted as EIN. Conditions as follows are satisfied: $1.0 \leq f/EP \leq 10$, $0.5 \leq HOS/f \leq 3$, $DDH \leq 10$ mm, and $0.2 \leq EIN/ETL < 1$.

A thickness of a single lens at height of ½ entrance pupil diameter (HEP) particularly affects the performance in correcting an optical path difference between rays in each field of view and correcting aberration for shared regions among fields of view within a range of ½ entrance pupil diameter (HEP). A capability of aberration correction is enhanced when the thickness is greater, but the difficulty in manufacturing such lenses also increases at the same time. Therefore, it is necessary to control the thickness of a single lens at height of ½ entrance pupil diameter (HEP), in particular, to control a proportional relationship (ETP/TP) of the thickness (ETP) of the lens at height of ½ entrance pupil diameter (HEP) to the thickness (TP) of the lens corresponding to the surface on the optical axis. For example, the thickness of the first lens at height of ½ entrance pupil diameter (HEP) is denoted as ETP1. The thickness of the second lens at height of ½ entrance pupil diameter (HEP) is denoted as ETP2. The thicknesses of other lenses are denoted according to a similar pattern. A sum of aforementioned ETP1 to ETP5 is denoted as SETP. Embodiments of the present disclosure may satisfy the following formula. $0.3 \leq SETP/EIN \leq 1$.

In order to balance the enhancement of the capability of aberration correction and reduce the difficulty in manufacturing at the same time, it is particularly necessary to control the proportional relationship (ETP/TP) of the thickness (ETP) of the lens at height of ½ entrance pupil diameter (HEP) to the thickness (TP) of the lens on the optical axis. For example, the thickness of the first lens at height of ½ entrance pupil diameter (HEP) is denoted as ETP1. The thickness of the first lens on the optical axis is denoted as TP1. Thus, the ratio between the aforementioned thicknesses is denoted as ETP1/TP. The thickness of the second lens at height of ½ entrance pupil diameter (HEP) is denoted as ETP2. The thickness of the second lens on the optical axis is denoted as TP2. Thus, the ratio between the aforementioned thicknesses is denoted as ETP2/TP2. The proportional relationships of the thicknesses of other lenses in the optical image capturing system at height of ½ entrance pupil diameter (HEP) to the thicknesses (TP) of the lenses on the optical axis are denoted according to a similar pattern. The embodiments of the present disclosure may satisfy the following formula: $0.2 \leq ETP/TP \leq 3$.

A horizontal distance between two adjacent lenses at height of ½ entrance pupil diameter (HEP) is denoted as ED. The horizontal distance (ED) described above is parallel with the optical axis of the optical image capturing system and particularly affects the performance in correcting the optical path difference between the rays in each field of view and in correcting aberration for the shared region among the fields of view within the range of ½ entrance pupil diameter (HEP). The capability of aberration correction may be enhanced when the horizontal distance becomes greater, but the difficulty in manufacturing the lenses is also increased and the degree of 'minimization' to the length of the optical image capturing system is also restricted at the same time. Thus, it is essential to control the horizontal distance (ED) between two specific adjacent lenses at height of ½ entrance pupil diameter (HEP).

In order to balance the enhancement of the capability of aberration correction and the reduction of the difficulty for 'minimization' to the length of the optical image capturing system at the same time, it is particularly necessary to control the proportional relationship (ED/IN) of the horizontal distance (ED) between the two adjacent lenses at height of ½ entrance pupil diameter (HEP) to the horizontal distance (IN) between the two adjacent lenses on the optical axis. For example, the horizontal distance between the first lens and the second lens at height of ½ entrance pupil diameter (HEP) is denoted as ED12. The horizontal distance between the first lens and the second lens on the optical axis is denoted as IN12. The ratio between the aforementioned distances is denoted as ED12/IN12. The horizontal distance between the second lens and the third lens at height of ½ entrance pupil diameter (HEP) is denoted as ED23. The horizontal distance between the second lens and the third lens on the optical axis is denoted as IN23. The ratio between the aforementioned distances is denoted as ED23/IN23. The proportional relationships of the horizontal distances between the other two adjacent lenses in the optical image capturing system at height of ½ entrance pupil diameter (HEP) to the horizontal distances between the two adjacent lenses on the optical axis are denoted according to a similar pattern.

The horizontal distance in parallel with the optical axis from a coordinate point on the image-side surface of the fifth lens at the height of ½ HEP to the image plane is denoted as EBL. The horizontal distance in parallel with the optical axis from the intersection point of the optical axis and the image-side surface of the fifth lens to the image plane is denoted as BL. In order to balance the enhancement of the capability of aberration correction and the reservation of accommodation space for other optical elements, the embodiment of the present disclosure may satisfy the following formula: $0.2 \leq EBL/BL \leq 1.1$. The optical image capturing system may further include a light filtering element, which is located between the fifth lens and the image plane. A distance in parallel with the optical axis from a coordinate point on the image-side surface of the fifth lens at height of ½ HEP to the light filtering element is denoted as EIR. A distance in parallel with the optical axis from an intersection point of the optical axis and the image-side surface of the fifth lens to the light filtering element is denoted as PIR. The embodiments of the present disclosure may satisfy the following formula: $0.1 \leq EIR/PIR \leq 1.0$.

A height of optical system (HOS) may be appropriately reduced so as to achieve a miniaturization of the optical image capturing system when $|f1| > f5$.

When a relationship of $|f2|+|f3|+|f4| > |f1|+|f5|$ is met, at least one of the second to the fourth lens may have a weak positive refractive power or a weak negative refractive power. The aforementioned weak refractive power indicates that an absolute value of the focal length of a specific lens is greater than 10. When at least one of the second lens to the fourth lens has the weak positive refractive power, the positive refractive power of the first lens may be shared, so as to prevent unnecessary aberration from appearing too early. On the contrary, when at least one of the second lens to the fourth lens has the weak negative refractive power, the aberration of the optical image capturing system may be corrected and fine-tuned.

In addition, the fifth lens may have a negative refractive power with a concave image-side surface. In this manner, a back focal length may be reduced to maintain a miniaturized optical image capturing system. Additionally, at least one surface of the fifth lens may possess at least one inflection point, which is capable of effectively reducing an incident angle of the off-axis FOV rays, thereby further correcting an off-axis FOV aberration.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The detailed structure, operating principle and effects of the present disclosure will now be described in more detail hereinafter with reference to the accompanying drawings that show various embodiments of the present disclosure as follows.

DETAILED DESCRIPTION

Figure 1A:
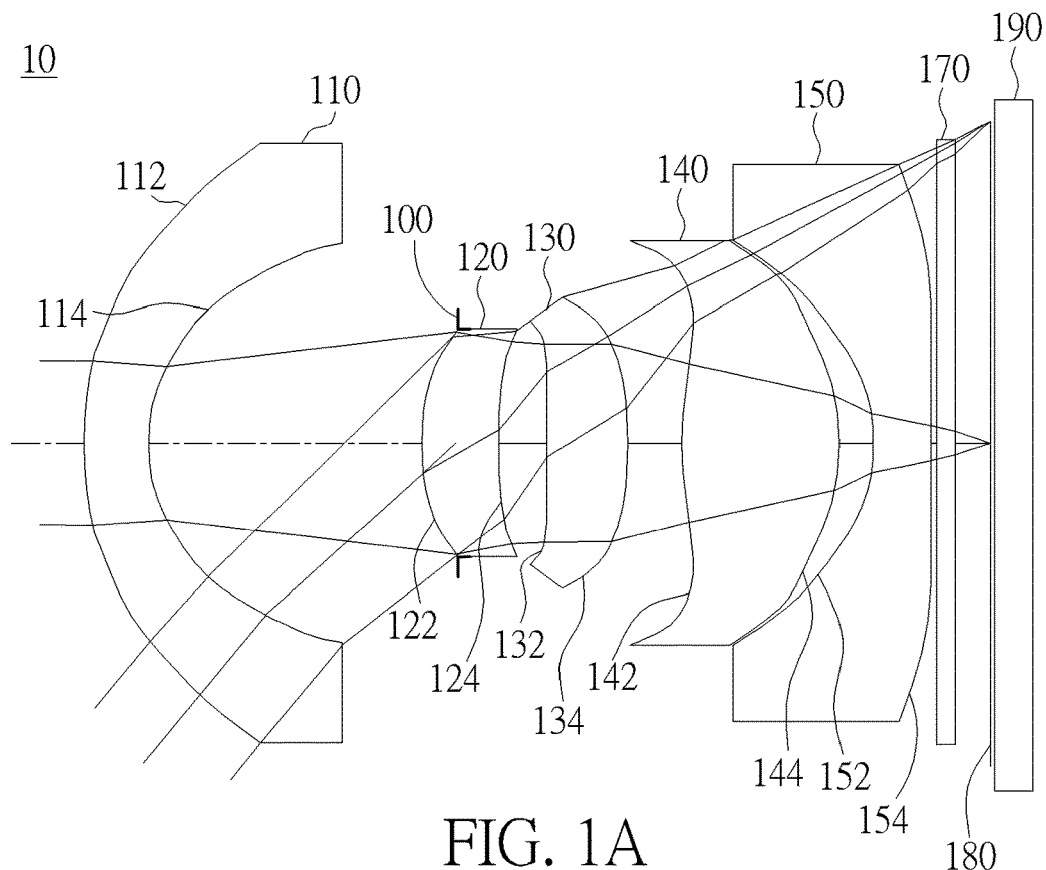
FIG. 1A is a schematic view of an optical image capturing system according to a first embodiment of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

An optical image capturing system, in sequence from an object side to an image side, includes a first lens, a second lens, a third lens, a fourth lens, and a fifth lens with refractive power. The optical image capturing system may further include an image sensing device, which is configured on an image plane.

The optical image capturing system may utilize three sets of operation wavelengths which are 486.1 nm, 587.5 nm and 656.2 nm respectively, wherein the 587.5 nm wavelength is served as a primary reference wavelength and a reference wavelength for obtaining technical features. The optical image capturing system may also utilize five sets of operation wavelengths which are 470 nm, 510 nm, 555 nm, 610 nm and 650 nm respectively, wherein the 555 nm wavelength is served as the primary reference wavelength and the reference wavelength for obtaining technical features.

A ratio of the focal length f of the optical image capturing system to the focal length fp of each lens with positive refractive power is denoted as PPR. A ratio of the focal length f of the optical image capturing system to the focal length fn of each lens with negative refractive power is denoted as NPR. A sum of the PPR of all lenses with positive refractive powers is denoted as ΣPPR, and a sum of the NPR of all lenses with negative refractive powers is denoted as ΣNPR. A total refractive power and a total length of the optical image capturing system may be easier to control when the following conditions are met: 0.5≤ΣPPR/|ΣNPR|≤3.0; preferably, the following condition may be met: 1.0≤ΣPPR/|ΣNPR|≤2.5.

The optical image capturing system may further include an image sensing device, which is configured on an image plane. Half of a diagonal of an effective sensing field of the image sensing device (i.e. the image height or the so-called maximum image height of the optical image capturing system) is denoted as HOI. A distance on the optical axis from the object-side surface of the first lens to the image plane is denoted as HOS, which meets the following conditions: HOS/HOI≤25 and 0.5≤HOS/f≤25. Preferably, the following conditions may be met: 1≤HOS/HOI≤20 and 1≤HOS/f≤20. As a result, the optical image capturing system may remain miniaturized, so as to be applicable to a light-weight and portable electronic product.

In addition, in the optical image capturing system of the disclosure, at least one aperture may be configured depending on requirements so as to reduce stray light and improve image quality.

In the optical image capturing system of the disclosure, the aperture may be configured as a front-set aperture or middle-set aperture, wherein the front-set aperture is disposed between a photographed object and the first lens, and the middle-set aperture is disposed between the first lens and the image plane. If the aperture is the front-set aperture, a longer distance between the exit pupil and the image plane of the optical image capturing system may be provided, such that more optical elements may be accommodated in the optical image capturing system, and an efficiency of the image sensing device in receiving images may be improved. If the aperture is the middle-set aperture, an angle of field of view (FOV) of the optical image capturing system may be expanded, such that the optical image capturing system has the same advantage as wide-angle cameras. A distance from the aforementioned apertures to the image plane is denoted as InS, which meets the following conditions: $0.2 \leq InS/HOS \leq 1.1$. Hence, the optical image capturing system may simultaneously be miniaturized while equipped with wide-angle features.

In the optical image capturing system of the present disclosure, a distance from the object-side surface of the first lens to the image-side surface of the fifth lens is denoted as InTL. A sum of central thicknesses of all lenses with refractive power on the optical axis is denoted as $\Sigma TP$. The following condition is met: $0.1 \leq \Sigma TP/InTL \leq 0.9$. In this manner, a suitable contrast ratio for image formation in the optical image capturing system and a suitable yield rate of manufacturing the lenses may be simultaneously achieved, and an appropriate back focal length may be provided so as to accommodate other optical elements in the optical image capturing system.

A curvature radius of the object-side surface of the first lens is denoted as R1, a curvature radius of the image-side surface of the first lens is denoted as R2, and the following conditions are met: $0.01 \leq |R1/R2| \leq 100$. In this manner, the first lens has a suitable magnitude of the positive refractive power, so as to prevent the spherical aberration from increasing too fast. Preferably, the following condition may be met: $0.05 \leq |R1/R2| < 80$.

A curvature radius of the object-side surface of the fifth lens is denoted as R9. A curvature radius of the image-side surface of the fifth lens is denoted as R10. The following condition is met: $-50 < (R9-R10)/(R9+R10) < 50$. Such configuration is beneficial for correcting astigmatism generated by the optical image capturing system.

A distance between the first lens and the second lens on the optical axis is denoted as IN12. The following condition is met: $0 < IN12/f \leq 5.0$. Hence, chromatic aberration of the lens may be mitigated, such that performance thereof is improved.

A distance between the fourth lens and the fifth lens on the optical axis is denoted as IN45. The following condition is met: $IN45/f \leq 5.0$. Hence, chromatic aberration of the lens may be mitigated, such that performance thereof is improved.

A central thicknesses of the first lens and the second lens on the optical axis are denoted as TP1 and TP2, respectively, which meets the following condition: $0.1 \leq (TP1+IN12)/TP2 \leq 50.0$. Hence, a sensitivity formed via the optical image capturing system may be easier to control, and performance of the optical image capturing system may be improved.

Central thicknesses of the fourth lens and the fifth lens on the optical axis are denoted as TP4 and TP5, respectively, and a distance between the aforementioned two lenses on the optical axis is denoted as IN45. The following condition is met: $0.1 \leq (TP5+IN45)/TP4 \leq 50.0$. Hence, a sensitivity formed via the optical image capturing system may be easier to control, and a total height of the optical image capturing system may be reduced.

Central thicknesses of the second lens, the third lens and the fourth lens on the optical axis are denoted as TP2, TP3 and TP4, respectively; a distance between the second lens and the third lens on the optical is denoted as IN23, and a distance between the third lens and the fourth lens on the optical is denoted as IN34. A distance from an object-side surface of the first lens to an image-side surface of the fifth lens is denoted as InTL. The following condition is met: $0.1 \leq TP3/(IN23+TP3+IN34) < 1$. Hence, an aberration generated in a process of the incident light travelling inwardly into the optical image capturing system may be easier to gradually correct layer upon layer, and a total height of the optical image capturing system may be reduced.

In the optical image capturing system of the present disclosure, a perpendicular distance between a critical point C51 on the object-side surface of the fifth lens and the optical axis is denoted as HVT51. A perpendicular distance to the optical axis between a critical point C52 on the image-side surface of the fifth lens and the optical axis is denoted as HVT52. A horizontal shift distance in parallel with the optical axis between an intersection of the object-side surface of the fifth lens on the optical axis and the critical point C51 is denoted as SGC51. A horizontal shift distance in parallel with the optical axis between an intersection of the image-side surface of the fifth lens on the optical axis and the critical point C52 is denoted as SGC52. The following conditions are satisfied: $0 \text{ mm} \leq HVT51 \leq 3 \text{ mm}$; $0 \text{ mm} < HVT52 \leq 6 \text{ mm}$; $0 \leq HVT51/HVT52$; $0 \text{ mm} \leq |SGC51| \leq 0.5 \text{ mm}$; $0 \text{ mm} < |SGC52| \leq 2 \text{ mm}$; and $0 < |SGC52|/(|SGC52|+TP5) \leq 0.9$. Hence, an off-axis FOV aberration may be effectively corrected.

In the optical image capturing system of the present disclosure, the following conditions are satisfied: $0.2 \leq HVT52/HOI \leq 0.9$. Preferably, the following conditions are satisfied: $0.3 \leq HVT52/HOI \leq 0.8$. Hence, an aberration of a peripheral field of view of the optical image capturing system may be corrected.

In the optical image capturing system of the present disclosure, the following conditions are satisfied: $0 \leq HVT52/HOS \leq 0.5$. Preferably, the following conditions are satisfied: $0.2 \leq HVT52/HOI \leq 0.45$. Hence, an aberration of a peripheral field of view of the optical image capturing system may be corrected.

In the optical image capturing system of the present disclosure, a horizontal shift distance in parallel with the optical axis from an inflection point which is nearest to the optical axis on the object-side surface of the fifth lens to an intersection point on the optical axis of the object-side surface of the fifth lens is denoted as SGI511. A horizontal shift distance in parallel with the optical axis from an inflection point which is nearest to the optical axis on the image-side surface of the fifth lens to an intersection point on the optical axis of the image-side surface of the fifth lens is denoted as SGI521. The following conditions are met: $0 < SGI511/(SGI511+TP5) \leq 0.9$ and $0 < SGI521/(SGI521+TP5) \leq 0.9$. Preferably, the following conditions may be met: $0.1 \leq SGI511/(SGI511+TP5) \leq 0.6$ and $0.1 \leq SGI521/(SGI521+TP5) \leq 0.6$.

A horizontal shift distance in parallel with the optical axis from the inflection point which is the second nearest to the optical axis on the object-side surface of the fifth lens to an intersection point on the optical axis of the object-side surface of the fifth lens is denoted as SGI512. A horizontal shift distance in parallel with the optical axis from the inflection point which is the second nearest to the optical axis on the image-side surface of the fifth lens to an intersection point on the optical axis of the image-side surface of the fifth lens is denoted as SGI522. The following conditions are met: $0 < SGI512/(SGI512+TP5) \leq 0.9$ and 0<SGI522/(SGI522+TP5)≤0.9. Preferably, the following conditions may be met: 0.1≤SGI512/(SGI512+TP5)≤0.6 and 0.1≤SGI522/(SGI522+TP5)≤0.6.

A perpendicular distance to the optical axis between the inflection point which is nearest to the optical axis on the object-side surface of the fifth lens and the optical axis is denoted as HIF511. A perpendicular distance to the optical axis between the inflection point which is nearest to the optical axis on the image-side surface of the fifth lens and an intersection point on the optical axis of the image-side surface of the fifth lens is denoted as HIF521. The following conditions are met: 0.001 mm≤|HIF511|≤5 mm; 0.001 mm≤|HIF521|≤5 mm. Preferably, the following conditions may be met: 0.1 mm≤|HIF511|≤3.5 mm; 1.5 mm≤|HIF521|≤3.5 mm.

A perpendicular distance to the optical axis between the inflection point which is the second nearest to the optical axis on the object-side surface of the fifth lens and the optical axis is denoted as HIF512. A perpendicular distance to the optical axis between an intersection point on the optical axis of the image-side surface of the fifth lens and the inflection point which is the second nearest to the optical axis on the image-side surface of the fifth lens is denoted as HIF522. The following conditions are met: 0.001 mm≤|HIF512|≤5 mm; 0.001 mm≤|HIF522|≤5 mm. Preferably, the following conditions are met: 0.1 mm≤|HIF522|≤3.5 mm; 0.1 mm≤|HIF512|≤3.5 mm.

A perpendicular distance to the optical axis between the inflection point which is the third nearest to the optical axis on the object-side surface of the fifth lens and the optical axis is denoted as HIF513. A perpendicular distance to the optical axis between an intersection point on the optical axis of the image-side surface of the fifth lens and the inflection point which is the third nearest to the optical axis on the image-side surface of the fifth lens is denoted as HIF523. The following conditions are met: 0.001 mm≤|HIF513|≤5 mm and 0.001 mm≤|HIF523|≤5 mm; preferably, the following conditions may be met: 0.1 mm≤|HIF523|≤3.5 mm and 0.1 mm≤|HIF513|≤3.5 mm.

A perpendicular distance to the optical axis between the inflection point which is the fourth nearest to the optical axis on the object-side surface of the fifth lens and the optical axis is denoted as HIF514. A perpendicular distance to the optical axis between an intersection point on the optical axis of the image-side surface of the fifth lens and the inflection point which is the fourth nearest to the optical axis on the image-side surface of the fourth lens is denoted as HIF524. The following conditions are met: 0.001 mm≤|HIF514|≤5 mm and 0.001 mm≤|HIF524|≤5 mm; preferably, the following conditions may be met: 0.1 mm≤|HIF524|≤3.5 mm and 0.1 mm≤|HIF514|≤3.5 mm.

In one embodiment of the optical image capturing system of the present disclosure, a chromatic aberration of the optical image capturing system may be easier to correct via alternately arranging lenses with a large Abbe number and a small Abbe number.

An equation of the aforementioned aspheric surface is:

$$z = ch2/[1+[1-(k+1)c2h2]0.5] + A4h4 + A6h6 + A8h8 + A10h10 + A12h12 + A14h14 + A16h16 + A18h18 + A20h20 + \ldots \quad (1),$$

wherein z is a position value of the position at a height h along the optical axis which refers to the surface apex, k is the conic coefficient, c is the reciprocal of curvature radius, and A4, A6, A8, A10, A12, A14, A16, A18 as well as A20 are high-order aspheric coefficients.

In the optical image capturing system provided by the present disclosure, a material of lens may be glass or plastic. If a plastic material is adopted, a manufacture cost as well as a weight of the lens may be reduced effectively. If a glass material is adopted, a heat effect may be controlled, and a design space for configuring the lenses with their respective refractive powers of the optical image capturing system may also be increased. Additionally, the object-side surface and the image-side surface of the first to the fifth lens in the optical image capturing system may be aspheric surfaces, which provide more controlled variables, such that the number of lenses used may be less than that the number of lenses used when traditional glass lenses are selected; in addition, the aberration may be mitigated as well. Hence, the total height of the optical image capturing system may be reduced effectively.

In addition, in the optical image capturing system provided by the present disclosure, if the surface of a lens is a convex surface, in principle the surface of the lens adjacent to the optical axis is a convex surface. If the surface of a lens is a concave surface, in principle the surface of the lens adjacent to the optical axis is a concave surface.

The optical image capturing system of the present disclosure may be further applied to an optical system with an automatic-focus feature depending on requirements. Having features of both aberration correction and an ability to form high-quality images, the optical image capturing system may have even broader applications.

The optical image capturing system of the present disclosure may further include a driving module depending on requirements, wherein the driving module may be coupled to the lenses to enable lens movement. The aforementioned driving module may be a voice coil motor (VCM) which is used to drive the lenses to focus, or may be an optical image stabilization (OIS) element which is used to reduce a frequency of through-focus occurrence resulting from lens vibration when shooting photo or video.

At least one lens among the first, second, third, fourth, and fifth lenses of the optical image capturing system of the present disclosure may be set as a light filtering element which filters wavelength less than 500 nm depending on requirements. The light filtering element may be made by coating a film on at least one surface of the lens specifically having a filtering function, or by forming the lens itself with a material which may filter out light with short wavelengths.

An image-side surface of the optical image capturing system of the present disclosure may further be set as a flat surface or a curved surface depending on requirements. When the image-side surface is a curved surface (such as a spherical surface with a curvature radius), an incident angle for focusing light at the image-side surface may be reduced, which may in turn help reducing a total length (TTL) of the miniaturized optical image capturing system while increasing relative illuminance.

Electronic products utilizing the optical image capturing system of the present disclosure may comprise a light admitting opening. The aforementioned light admitting opening may be a front-set aperture for an electronic product, and the light admitting opening is for limiting an optical path of incident light. The light admitting opening has a diameter denoted as DDH. The optical image capturing system of the present disclosure may further comprise at least one reflective element such as a prism or a reflective mirror depending on requirements, which may increase the number of applications, improve a spatial configuration of the optical image capturing system when disposed on an end device, and increase the total number of lenses able to be included within a limited space of the system. The aforementioned reflective element may be disposed between lenses of the optical image capturing system, thereby allowing a diameter of a mechanical opening through which incident light enters to be reduced. Additionally, the reflective element may be disposed on the object side of the first lens so as to reduce a total length of the optical image capturing system. More than two reflective elements may be used depending on requirements, and positions of the reflective surfaces may be adjusted based on spatial requirements. Prisms may be constructed using materials with a suitable refractive power or Abbe number, such as a glass material or a plastic material. A thickness of the prism (that is, a total length of an internal optical axis of the prism) is denoted as PT, which comprises an incident optical path PT1 (that is, a light path of a center field of view or an optical axis) and an exit optical path PT2 (that is, a light path of a center field of view or an optical axis). In short, PT=PT1+PT2. The thickness of the prism may change depending on the refractive power of the construction material, the angle of view of the optical image capturing system and the size of the aperture.

Specific embodiments are presented below in detail with reference to figures based on the description above.

First Embodiment

Figure 1B:
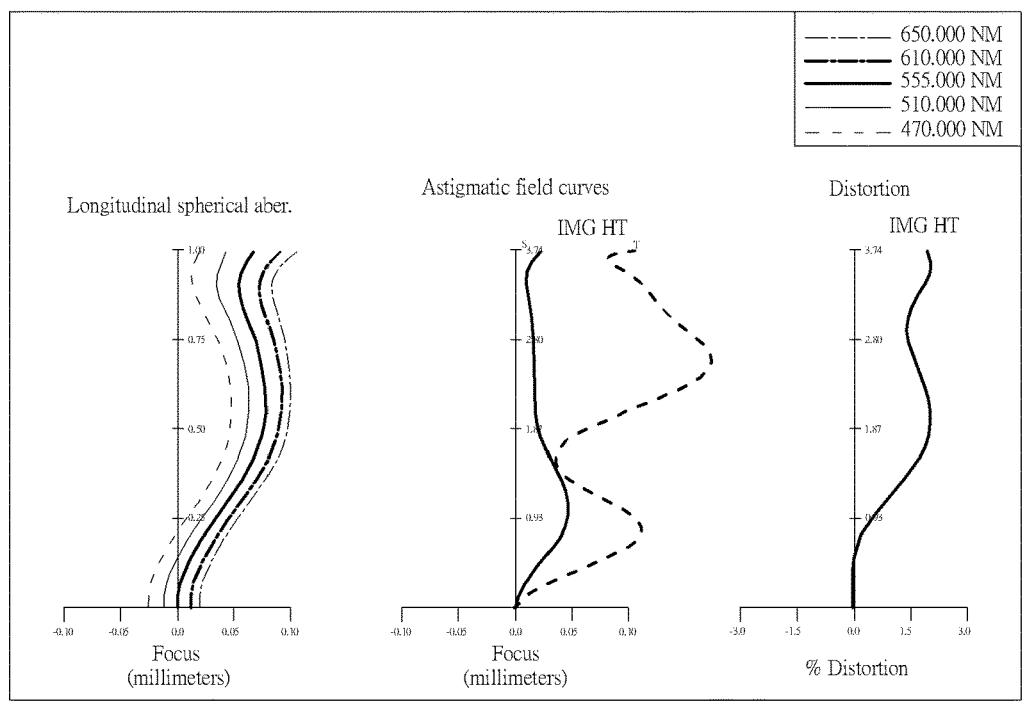
FIG. 1B is a curve diagram illustrating spherical aberration, astigmatism and optical distortion of the optical image capturing system in sequence from left to right according to the first embodiment of the present disclosure.
Figure 1C:
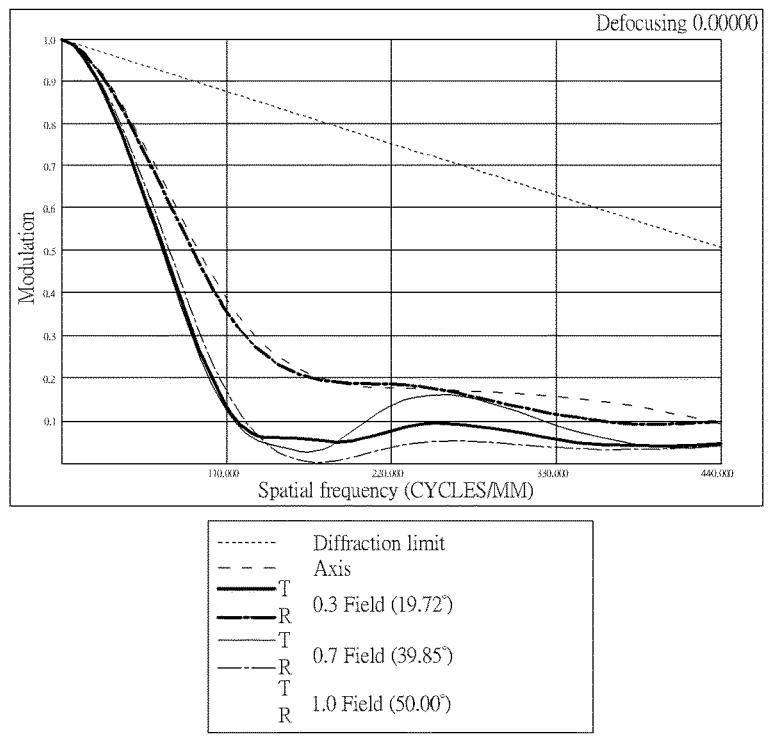
FIG. 1C is a characteristic diagram of modulation transfer of visible light spectrum according to the first embodiment of the present disclosure.

Please refer to FIGS. 1A and 1B, wherein FIG. 1A is a schematic view of the optical image capturing system according to the first embodiment of the present disclosure; FIG. 1B is a curve diagram illustrating the spherical aberration, astigmatism and optical distortion of the optical image capturing system in sequence from left to right according to the first embodiment of the present disclosure; FIG. 1C is a characteristic diagram of modulation transfer of visible light spectrum according to the first embodiment of the present disclosure. As shown in FIG. 1A, it may be seen that, in the order from the object side to the image side, the optical image capturing system includes a first lens 110, an aperture 100, a second lens 120, a third lens 130, a fourth lens 140, a fifth lens 150, an infrared filter 170, an image plane 180, and an image sensing device 190.

First lens 110 has negative refractive power and is made of plastic materials. The first lens 110 has a convex object-side surface 112 and a concave image-side surface 114, wherein both of the surfaces are aspheric, and the object-side surface 112 thereof has an inflection point. The central thickness of the first lens on the optical axis is denoted as TP1. The thickness of the first lens at height of ½ entrance pupil diameter (HEP) is denoted as ETP1.

A horizontal shift distance in parallel with the optical axis from an inflection point which is nearest to the optical axis on the object-side surface of the first lens to an intersection point on the optical axis of the object-side surface of the first lens is denoted as SGI111. A horizontal shift distance in parallel with the optical axis from an inflection point which is nearest to the optical axis on the image-side surface of the first lens to an intersection point on the optical axis of the image-side surface of the first lens is denoted as SGI121. The following conditions are met: SGI111=1.96546 mm, |SGI111|/(|SGI111|+TP1)=0.72369.

A perpendicular distance to the optical axis from the inflection point which is nearest to the optical axis on the object-side surface of the first lens to an intersection point on the optical axis of the object-side surface of the first lens is denoted as HIF111. A perpendicular distance to the optical axis from the inflection point which is nearest to the optical axis on the image-side surface of the first lens to an intersection point on the optical axis of the image-side surface of the first lens is denoted as HIF121. The following conditions are met: HIF111=3.38542 mm, HIF111/HOI=0.90519.

Second lens 120 has positive refractive power and is made of plastic materials. The second lens 120 has a convex object-side surface 122 and a concave image-side surface 124, wherein both of the surfaces are aspheric. The central thickness of the second lens on the optical axis is denoted as TP2. The thickness of the second lens at height of ½ entrance pupil diameter (HEP) is denoted as ETP2.

A horizontal shift distance in parallel with the optical axis from an inflection point which is nearest to the optical axis on the object-side surface of the second lens to an intersection point on the optical axis of the object-side surface of the second lens is denoted as SGI211. A horizontal shift distance in parallel with the optical axis from an inflection point which is nearest to the optical axis on the image-side surface of the second lens to an intersection point on the optical axis of the image-side surface of the second lens is denoted as SGI221.

A perpendicular distance to the optical axis from the inflection point which is nearest to the optical axis on the object-side surface of the second lens to an intersection point on the optical axis of the object-side surface of the second lens is denoted as HIF211. A perpendicular distance to the optical axis from the inflection point which is nearest to the optical axis on the image-side surface of the second lens to an intersection point on the optical axis of the image-side surface of the second lens is denoted as HIF221.

The third lens 130 has positive refractive power and is made of plastic materials. The third lens 130 has a convex object-side surface 132 and a convex image-side surface 134, wherein both of the surfaces are aspheric, and the object-side surface 132 thereof has an inflection point. The central thickness of the third lens on the optical axis is denoted as TP3. The thickness of the third lens at height of ½ entrance pupil diameter (HEP) is denoted as ETP3.

A horizontal shift distance in parallel with the optical axis from an inflection point which is nearest to the optical axis on the object-side surface of the third lens to an intersection point on the optical axis of the object-side surface of the third lens is denoted as SGI311. A horizontal shift distance in parallel with the optical axis from an inflection point which is nearest to the optical axis on the image-side surface of the third lens to an intersection point on the optical axis of the image-side surface of the third lens is denoted as SGI321. The following conditions are met: SGI311=0.00388 mm; |SGI311|/(|SGI311|+TP3)=0.00414.

A horizontal shift distance in parallel with the optical axis from an inflection point which is second nearest to the optical axis on the object-side surface of the third lens to an intersection point on the optical axis of the object-side surface of the third lens is denoted as SGI312. A horizontal shift distance in parallel with the optical axis from an inflection point which is second nearest to the optical axis on the image-side surface of the third lens to an intersection point on the optical axis of the image-side surface of the third lens is denoted as SGI322.

A perpendicular distance to the optical axis from the inflection point which is nearest to the optical axis on the object-side surface of the third lens to the optical axis is denoted as HIF311. A perpendicular distance to the optical axis from the inflection point which is nearest to the optical axis on the image-side surface of the third lens to the optical axis is denoted as HIF321. The following conditions are met: HIF311=0.38898 mm, HIF311/HOI=0.10400.

A perpendicular distance to the optical axis from the inflection point which is second nearest to the optical axis on the object-side surface of the third lens to the optical axis is denoted as HIF312. A perpendicular distance to the optical axis from the inflection point which is second nearest to the optical axis on the image-side surface of the third lens to an intersection point on the optical axis of the image-side surface of the third lens is denoted as HIF322.

The fourth lens 140 has positive refractive power and is made of plastic materials. The fourth lens 140 has a convex object-side surface 142 and a convex image-side surface 144, wherein both of the surfaces are aspheric, and the object-side surface 142 thereof has an inflection point. The central thickness of the fourth lens on the optical axis is denoted as TP4. The thickness of the fourth lens at height of ½ entrance pupil diameter (HEP) is denoted as ETP4.

A horizontal shift distance in parallel with the optical axis from an inflection point which is nearest to the optical axis on the object-side surface of the fourth lens to an intersection point on the optical axis of the object-side surface of the fourth lens is denoted as SGI411. A horizontal shift distance in parallel with the optical axis from an inflection point which is nearest to the optical axis on the image-side surface of the fourth lens to an intersection point on the optical axis of the image-side surface of the fourth lens is denoted as SGI421. The following conditions are met: SGI421=0.06508 mm; |SGI421|/(|SGI421|+TP4)=0.03459.

A horizontal shift distance in parallel with the optical axis from an inflection point which is second nearest to the optical axis on the object-side surface of the fourth lens to an intersection point on the optical axis of the object-side surface of the fourth lens is denoted as SGI412. A horizontal shift distance in parallel with the optical axis from an inflection point which is second nearest to the optical axis on the image-side surface of the fourth lens to an intersection point on the optical axis of the image-side surface of the fourth lens is denoted as SGI422.

A perpendicular distance to the optical axis from the inflection point which is nearest to the optical axis on the object-side surface of the fourth lens to the optical axis is denoted as HIF411. A perpendicular distance to the optical axis from the inflection point which is nearest to the optical axis on the image-side surface of the fourth lens to the optical axis is denoted as HIF421. The following conditions are met: HIF421=0.85606 mm, HIF421/HOI=0.22889.

A perpendicular distance to the optical axis from the inflection point which is second nearest to the optical axis on the object-side surface of the fourth lens to the optical axis is denoted as HIF412. A perpendicular distance to the optical axis from the inflection point which is second nearest to the optical axis on the image-side surface of the fourth lens to the optical axis is denoted as HIF422.

The fifth lens 150 has negative refractive power and is made of plastic materials. The fifth lens 150 has a concave object-side surface 152 and a concave image-side surface 154, wherein both of the surfaces are aspheric; the object-side surface 152 and the image-side surface 154 of the fifth lens 150 each has an inflection point. The central thickness of the fifth lens on the optical axis is denoted as TP5. The thickness of the fifth lens at height of ½ entrance pupil diameter (HEP) is denoted as ETP5.

A horizontal shift distance in parallel with the optical axis from an inflection point which is nearest to the optical axis on the object-side surface of the fifth lens to an intersection point on the optical axis of the object-side surface of the fifth lens is denoted as SGI511. A horizontal shift distance in parallel with the optical axis from an inflection point which is nearest to the optical axis on the image-side surface of the fifth lens to an intersection point on the optical axis of the image-side surface of the fifth lens is denoted as SGI521. The following conditions are met: SGI511=−1.51505 mm; |SGI511|/(|SGI511|+TP5)=0.70144; SGI521=0.01229 mm; |SGI521|/(|SGI521|+TP5)=0.01870.

A horizontal shift distance in parallel with the optical axis from an inflection point which is second nearest to the optical axis on the object-side surface of the fifth lens to an intersection point on the optical axis of the object-side surface of the fifth lens is denoted as SGI512. A horizontal shift distance in parallel with the optical axis from an inflection point which is second nearest to the optical axis on the image-side surface of the fifth lens to an intersection point on the optical axis of the image-side surface of the fifth lens is denoted as SGI522.

A perpendicular distance to the optical axis from the inflection point which is nearest to the optical axis on the object-side surface of the fifth lens to the optical axis is denoted as HIF511. A perpendicular distance to the optical axis from the inflection point which is nearest to the optical axis on the image-side surface of the fifth lens to the optical axis is denoted as HIF521. The following conditions are met: HIF511=2.25435 mm; HIF511/HOI=0.60277; HIF521=0.82313 mm; HIF521/HOI=0.22009.

A perpendicular distance to the optical axis from the inflection point which is second nearest to the optical axis on the object-side surface of the fifth lens to the optical axis is denoted as HIF512. A perpendicular distance to the optical axis from the inflection point which is second nearest to the optical axis on the image-side surface of the fifth lens to the optical axis is denoted as HIF522.

In the present embodiment, the distance in parallel with the optical axis from a coordinate point on the object-side surface of the first lens at the height of ½ HEP to the image plane is denoted as ETL. The distance in parallel with the optical axis from a coordinate point on the object-side surface of the first lens at the height of ½ HEP to a coordinate point on the image-side surface of the fifth lens at the height of ½ HEP is denoted as EIN. The following conditions are satisfied: ETL=10.449 mm, EIN=9.752 mm, and EIN/ETL=0.933.

The present embodiment satisfies the following conditions: ETP1=0.870 mm, ETP2=0.780 mm, ETP3=0.825 mm, ETP4=1.562 mm, and ETP5=0.923 mm. The sum of the aforementioned ETP1 to ETP5 is denoted as SETP, and SETP=4.960 mm. The following conditions are also satisfied: TP1=0.750 mm, TP2=0.895 mm, TP3=0.932 mm, TP4=1.816 mm, and TP5=0.645 mm. The sum of the aforementioned TP1 to TP5 is denoted as STP, and STP=5.039 mm, wherein SETP/STP=0.984.

In the present embodiment, the proportional relationship (ETP/TP) of the thickness (ETP) of each lens at the height of ½ entrance pupil diameter (HEP) to the central thickness (TP) of the lens corresponding to the surface on the optical axis is specifically manipulated, in order to achieve a balance between the ease of manufacturing the lenses and their ability to correct aberration. The following conditions are satisfied: ETP1/TP1=1.160, ETP2/TP2=0.871, ETP3/TP3=0.885, ETP4/TP4=0.860 and ETP5/TP5=1.431.

In the present embodiment, the horizontal distance between two adjacent lenses at the height of ½ entrance pupil diameter (HEP) is manipulated, in order to achieve a balance among the degree of "miniaturization" for the length HOS of the optical image capturing system, the ease of manufacturing the lenses and their capability of aberration correction. In particular, the proportional relationship (ED/

IN) of the horizontal distance (ED) between the two adjacent lenses at the height of ½ entrance pupil diameter (HEP) to the horizontal distance (IN) between the two adjacent lenses on the optical axis is controlled. The following conditions are satisfied: the horizontal distance in parallel with the optical axis between the first and second lenses at the height of ½ HEP is denoted as ED12, and ED12=3.152 mm; the horizontal distance in parallel with the optical axis between the second and third lenses at the height of ½ HEP is denoted as ED23, and ED23=0.478 mm; the horizontal distance in parallel with the optical axis between the third and fourth lenses at the height of ½ HEP is denoted as ED34, and ED34=0.843 mm. The horizontal distance in parallel with the optical axis between the fourth and fifth lenses at the height of ½ HEP is denoted as ED45, and ED45=0.320 mm. The sum of the aforementioned ED12 to ED45 is denoted as SED, and SED=4.792 mm.

The horizontal distance between the first and second lenses on the optical axis is denoted as IN12, wherein IN12=3.190 mm and the ratio ED12/IN12=0.988. The horizontal distance between the second and third lenses on the optical axis is denoted as IN23, wherein IN23=0.561 mm and the ratio ED23/IN23=0.851. The horizontal distance between the third and fourth lenses on the optical axis is denoted as IN34, where IN34=0.656 mm and ED34/IN34=1.284. The horizontal distance between the fourth and fifth lenses on the optical axis is denoted as IN45, where IN34=0.405 mm and ED45/IN45=0.792. The sum of the aforementioned IN12 to IN45 is denoted as SIN, and SIN=0.999 mm, wherein SED/SIN=1.083.

The present embodiment also satisfies the following conditions: ED12/ED23=6.599, ED23/ED34=0.567, ED34/ED45=2.630, IN12/IN23=5.687, IN23/IN34=0.855, IN34/IN45=1.622.

The horizontal distance in parallel with the optical axis from a coordinate point on the image-side surface of the fifth lens at the height of ½ HEP to the image plane is denoted as EBL, and EBL=0.697 mm. The horizontal distance in parallel with the optical axis from the intersection point on the optical axis of the image-side surface of the fifth lens to the image plane is denoted as BL, and BL=0.71184 mm. The embodiment of the present disclosure may satisfy the following condition: EBL/BL=0.979152. In the present embodiment, the distance in parallel with the optical axis from a coordinate point on the image-side surface of the fifth lens at the height of ½ HEP to the infrared filter is denoted as EIR, and EIR=0.085 mm. The distance in parallel with the optical axis from the intersection point on the optical axis of the image-side surface of the fifth lens to the infrared filter is denoted as PIR, and PIR=0.100 mm. The following condition is satisfied: EIR/PIR=0.847.

The infrared filter 170 is made of glass materials and configured between the fifth lens 150 and the image plane 180. Additionally, the infrared filter 170 does not affect the focal length of the optical image capturing system.

In the optical image capturing system of the present embodiment, the focal length of the optical image capturing system is f, the entrance pupil diameter of the optical image capturing system is HEP, and half of the maximum angle of view of the optical image capturing system is HAF. The detailed parameters are shown as follows: f=3.03968 mm, f/HEP=1.6, HAF=50.001 deg. and tan(HAF)=1.1918.

In the optical image capturing system of the present embodiment, the focal length of the first lens 110 is f1, and the focal length of the fifth lens 150 is f5. The following conditions are met: f1=−9.24529 mm, |f/f1|=0.32878, f5=−2.32439 mm and |f1|>f5.

In the optical image capturing system of the present embodiment, the focal length of the second lens 120, the third lens 130, the fourth lens 140 and the fifth lens 150 is f2, f3, f4 and f5, respectively. The following conditions are met: |f2|+|f3|+|f4|=17.3009 mm; |f1|+|f5|=11.5697 mm and |f2|+|f3|+|f4|>|f1|+|f5|.

The ratio of the focal length f of the optical image capturing system to a focal length fp of each of lenses with positive refractive powers is denoted as PPR. The ratio of the focal length f of the optical image capturing system to a focal length fn of each of lenses with negative refractive powers is denoted as NPR. In the optical image capturing system of the present embodiment, the sum of the PPR of all lenses with positive refractive power is ΣPPR=f/f2+f/f3+f/f4=1.86768, and the sum of the NPR of all lenses with negative refractive power is ΣNPR=f/f1+f/f5=−1.63651, wherein ΣPPR/|ΣNPR|=1.14125. The following conditions are also met: |f/f2|=0.47958; |f/f3|=0.38289; |f/f4|=1.00521; |f/f5|=1.30773.

In the optical image capturing system of the present embodiment, a distance from the object-side surface 112 of the first lens to the image-side surface 154 of the fifth lens is denoted as InTL. A distance from the object-side surface 112 of the first lens to the image plane 180 is denoted as HOS. A distance from the aperture 100 to the image plane 180 is denoted as InS. Half of a diagonal length of an effective sensing field of the image sensing device 190 is denoted as HOI. A distance from the image-side surface 154 of the fifth lens to the image plane 180 is denoted as BFL. The following conditions are met: InTL+BFL=HOS; HOS=10.56320 mm; HOI=3.7400 mm; HOS/HOI=2.8244; HOS/f=3.4751; InS=6.21073 mm; and InS/HOS=0.5880.

In the optical image capturing system of the present embodiment, the sum of central thicknesses of all lenses with refractive power on the optical axis is denoted as ΣTP. The following conditions are met: ΣTP=5.0393; InTL=9.8514 mm and ΣTP/InTL=0.5115. In this manner, a suitable contrast ratio for image formation in the optical image capturing system and a suitable yield rate of manufacturing the lenses may be simultaneously achieved, and an appropriate back focal length may be provided so as to accommodate other optical elements in the optical image capturing system.

In the optical image capturing system of the present embodiment, the curvature radius of the object-side surface 112 of the first lens is denoted as R1. The curvature radius of the image-side surface 114 of the first lens is denoted as R2. The following condition is met: |R1/R2|=1.9672. Hence, the first lens element has a suitable magnitude of the positive refractive power, so as to prevent the spherical aberration from increasing too fast.

In the optical image capturing system of the first embodiment, the curvature radius of the object-side surface 152 of the fifth lens is denoted as R9. The curvature radius of the image-side surface 154 of the fifth lens is denoted as R10. The following condition is satisfied: (R9−R10)/(R9+R10)=−1.1505. Hence, the astigmatism generated by the optical image capturing system may be easier to correct.

In the optical image capturing system of the present embodiment, the sum of the focal lengths of all lenses with positive refractive power is denoted as ΣPP, which meets the following conditions: ΣPP=f2+f3+f4=17.30090 mm, and f2/(f2+f3+f4)=0.36635. Therefore, the positive refractive power of the second lens 120 may be distributed to other lenses with positive refractive power appropriately, so as to suppress noticeable aberrations generated in the process of the incident light travelling inwardly into the optical image capturing system.

In the optical image capturing system of the present embodiment, the sum of the focal lengths of all lenses with negative refractive power is denoted as ΣNP, which meets the following conditions: ΣNP=f1+f5=−11.56968 mm, and f5/(f1+f5)=0.20090. Therefore, the negative refractive power of the fifth lens 150 may be distributed to other lenses with negative refractive power appropriately, so as to suppress noticeable aberrations generated in the process of the incident light travelling inwardly into the optical image capturing system.

In the optical image capturing system of the present embodiment, the distance between the first lens 110 and the second lens 120 on the optical axis is denoted as IN12. The following conditions are satisfied: IN12=3.19016 mm, and IN12/f=1.04951. Hence, the chromatic aberration of the lenses may be mitigated, so as to improve the performance thereof.

In the optical image capturing system of the present embodiment, the distance between the fourth lens 140 and the fifth lens 150 on the optical axis is denoted as IN45. The following conditions are satisfied: IN45=0.40470 mm; IN45/f=0.13314. Hence, the chromatic aberration of the lenses may be mitigated, so as to improve the performance thereof.

In the optical image capturing system of the present embodiment, central thicknesses of the first lens 110, the second lens 120 and the third lens 130 on the optical axis are denoted as TP1, TP2 and TP3 respectively. The following conditions are satisfied: TP1=0.75043 mm; TP2=0.89543 mm; TP3=0.93225 mm; and (TP1+IN12)/TP2=4.40078. Hence, the sensitivity formed via the optical image capturing system may be easier to control, and the performance thereof may be improved.

In the optical image capturing system of the present embodiment, central thicknesses of the fourth lens 140 and the fifth lens 150 on the optical axis are denoted as TP4 and TP5, respectively. The distance between the aforementioned two lenses on the optical axis is denoted as IN45. The following conditions are satisfied: TP4=1.81634 mm; TP5=0.64488 mm; and (TP5+IN45)/TP4=0.57785. Hence, the sensitivity formed via the optical image capturing system may be easier to control, and the total height of the optical image capturing system may be reduced.

In the optical image capturing system of the present embodiment, the distance between the third lens 130 and the fourth lens 140 on the optical axis is denoted as IN34. A distance from the object-side surface 112 of the first lens to the image-side surface 154 of the fifth lens is denoted as InTL. The following conditions are satisfied: TP2/TP3=0.96051; TP3/TP4=0.51325; TP4/TP5=2.81657; and TP3/(IN23+TP3+IN34)=0.43372. Hence, an aberration generated in a process of the incident light travelling inwardly into the optical image capturing system may be easier to gradually correct layer upon layer, and a total height of the optical image capturing system may be reduced.

In the optical image capturing system of the present embodiment, a horizontal shift distance in parallel with the optical axis from a maximum effective half diameter position to an intersection point of the optical axis and the object-side surface 142 of the fourth lens is denoted as InRS41. A horizontal shift distance in parallel with the optical axis from a maximum effective half diameter position to an intersection point of the optical axis and the image-side surface 144 of the fourth lens is denoted as InRS42. A central thickness of the fourth lens 140 is denoted as TP4. The following conditions are satisfied: InRS41=−0.09737 mm, InRS42=−1.31040 mm, |InRS41|/TP4=0.05361 and |InRS42|/TP4=0.72145. Hence, the configuration is beneficial for manufacturing and forming the lenses, and for effectively reducing a size of the optical image capturing system.

In the optical image capturing system of the present embodiment, a perpendicular distance to the optical axis between a critical point C41 on the object-side surface 142 of the fourth lens and the optical axis is denoted as HVT41. A perpendicular distance to the optical axis between a critical point C42 on the image-side surface 144 of the fourth lens and the optical axis is denoted as HVT42. The following conditions are satisfied: HVT41=1.41740 mm and HVT42=0 mm.

In the optical image capturing system of the present embodiment, a horizontal shift distance in parallel with the optical axis from a maximum effective half diameter position to an intersection point of the optical axis and the object-side surface 152 of the fifth lens is denoted as InRS51. A horizontal shift distance in parallel with the optical axis from a maximum effective half diameter position to an intersection point of the optical axis and the image-side surface 154 of the fifth lens is denoted as InRS52. A central thickness of the fifth lens 150 is denoted as TP5. The following conditions are satisfied: InRS51=−1.63543 mm; InRS52=−0.34495 mm; |InRS51|/TP5=2.53604 and |InRS52|/TP5=0.53491. Hence, the configuration is beneficial for manufacturing and forming the lenses, and for effectively reducing a size of the optical image capturing system.

In the optical image capturing system of the present embodiment, a perpendicular distance to the optical axis between the critical point C51 on the object-side surface 152 of the fifth lens and the optical axis is denoted as HVT51. A perpendicular distance to the optical axis between the critical point C52 on the image-side surface 154 of the fifth lens and the optical axis is denoted as HVT52. The following conditions are satisfied: HVT51=0; HVT52=1.35891 mm; and HVT51/HVT52=0.

In the optical image capturing system of the present embodiment, the following conditions are satisfied: HVT52/HOI=0.36334. Hence, the aberration of the peripheral field of view of the optical image capturing system may be corrected.

In the optical image capturing system of the present embodiment, the following conditions are satisfied: HVT52/HOS=0.12865. Hence, the aberration of the peripheral field of view of the optical image capturing system may be corrected.

In the optical image capturing system of the present embodiment, the third lens and the fifth lens have positive refractive powers, an Abbe number of the third lens is denoted as NA3, an Abbe number of the fifth lens is denoted as NA5, and the following condition is satisfied: NA5/NA3=0.368966. Hence, the chromatic aberration of the optical image capturing system may be easier to correct.

In the optical image capturing system of the present embodiment, the TV distortion and optical distortion when images are formed in the optical image capturing system are TDT and ODT, respectively. The following conditions are satisfied: |TDT|=0.63350% and |ODT|=2.061350%.

In the optical image capturing system of the present embodiment, the modulation transfer rates (values of MTF) for the visible light at the spatial frequency of 55 cycles/mm at positions of the optical axis, 0.3 HOI and 0.7 HOI on the image plane are denoted as MTFE0, MTFE3 and MTFE7 respectively. The following conditions are satisfied: MTFE0 is about 0.65, MTFE3 is about 0.47 and MTFE7 is about 0.39. The modulation transfer rates (values of MTF) for the visible light at a spatial frequency of 110 cycles/mm at positions of the optical axis, 0.3HOI and 0.7HOI on the image plane are denoted as MTFQ0, MTFQ3 and MTFQ7 respectively. The following conditions are satisfied: MTFQ0 is about 0.38, MTFQ3 is about 0.14 and MTFQ7 is about 0.13. The modulation transfer rates (values of MTF) for the visible light at a spatial frequency of 220 cycles/mm at positions of the optical axis, 0.3HOI and 0.7HOI on the image plane are denoted as MTFH0, MTFH3 and MTFH7 respectively. The following conditions are satisfied: MTFH0 is about 0.17, MTFH3 is about 0.07 and MTFH7 is about 0.14.

In the optical image capturing system of the present embodiment, when the operation wavelength of 850 nm is focused on the image plane, the contrast transfer rates (values of MTF) with a spatial frequency of 55 cycles/mm at positions of the optical axis, 0.3 field of view and 0.7 field of view on the image plane are denoted as MTFI0, MTFI3 and MTFI7, respectively. The following conditions are satisfied: MTFI0 is about 0.05, MTFI3 is about 0.12 and MTFI7 is about 0.11

Table 1 and Table 2 below should be incorporated into the reference of the present embodiment.

TABLE 1

Lens parameters of the first embodiment
f(focal length) = 3.03968 mm ; f/HEP = 1.6 ; HAF(half angle of view) = 50.0010 deg.

| Surface No. | | Curvature Radius | Thickness (mm) | Material | Refractive Index | Abbe No. | Focal Distance |
|---|---|---|---|---|---|---|---|
| 0 | Object | Plane | At infinity | | | | |
| 1 | Lens 1 | 4.01438621 | 0.750 | Plastic | 1.514 | 56.80 | −9.24529 |
| 2 | | 2.040696375 | 3.602 | | | | |
| 3 | Aperture | Plane | −0.412 | | | | |
| 4 | Lens 2 | 2.45222384 | 0.895 | Plastic | 1.565 | 58.00 | 6.33819 |
| 5 | | 6.705898264 | 0.561 | | | | |
| 6 | Lens 3 | 16.39663088 | 0.932 | Plastic | 1.565 | 58.00 | 7.93877 |
| 7 | | −6.073735083 | 0.656 | | | | |
| 8 | Lens 4 | 4.421363446 | 1.816 | Plastic | 1.565 | 58.00 | 3.02394 |
| 9 | | −2.382933539 | 0.405 | | | | |
| 10 | Lens 5 | −1.646639396 | 0.645 | Plastic | 1.650 | 21.40 | −2.32439 |
| 11 | | 23.53222697 | 0.100 | | | | |
| 12 | Infrared Filter | 1E+18 | 0.200 | BK7_ SCHOTT | 1.517 | 64.20 | |
| 13 | | 1E+18 | 0.412 | | | | |
| 14 | Image Plane | 1E+18 | | | | | |

Reference wavelength = 555 nm

TABLE 2 aspheric coefficients of the first embodiment
Table 2: aspheric coefficients

| | Surface No. | | | | | | |
|---|---|---|---|---|---|---|---|
| | 1 | 2 | 4 | 5 | 6 | 7 | 8 |
| k | −1.882119E−01 | −1.927558E+00 | −6.483417E+00 | 1.766123E+01 | −5.000000E+01 | −3.544648E+01 | −3.167522E+01 |
| A4 | 7.686381E−04 | 3.070422E−02 | 5.439775E−02 | 7.241691E−02 | −2.985209E−02 | −6.315366E−02 | −1.903506E−03 |
| A6 | 4.630306E−04 | −3.565153E−03 | −7.980567E−03 | −8.359563E−03 | −7.175713E−03 | 6.038040E−03 | −1.806837E−03 |
| A8 | 3.178966E−05 | 2.062259E−03 | −3.537039E−04 | 1.303430E−02 | 4.284107E−03 | 4.674156E−03 | −1.670351E−03 |
| A10 | −1.773597E−05 | −1.571117E−04 | 2.844845E−03 | −6.951350E−03 | −5.492349E−03 | −8.031117E−03 | 4.791024E−04 |
| A12 | 1.620619E−06 | −4.694004E−05 | −1.025049E−03 | 1.366262E−03 | 1.232072E−03 | 3.319791E−03 | −5.594125E−05 |
| A14 | −4.916041E−08 | 7.399980E−06 | 1.913679E−04 | 3.588298E−04 | −4.107269E−04 | −5.356799E−04 | 3.704401E−07 |
| A16 | 0.000000E+00 | 0.000000E+00 | 0.000000E+00 | 0.000000E+00 | 0.000000E+00 | 0.000000E+00 | 0.000000E+00 |
| A18 | 0.000000E+00 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 | 0.000000E+00 |

| | Surface No. | | |
|---|---|---|---|
| | 9 | 10 | 11 |
| k | −2.470764E+00 | −1.570351E+00 | 4.928899E+01 |
| A4 | −2.346908E−04 | −4.250059E−04 | −4.625703E−03 |
| A6 | 2.481207E−03 | −1.591781E−04 | −7.108872E−04 |
| A8 | −5.862277E−03 | −3.752177E−05 | 3.429244E−05 |
| A10 | −1.955029E−04 | −9.210114E−05 | 2.887298E−06 |
| A12 | 1.880941E−05 | −1.101797E−05 | 3.684628E−07 |
| A14 | 1.132586E−06 | 3.536320E−06 | −4.741322E−08 |
| A16 | 0.000000E+00 | 0.000000E+00 | 0.000000E+00 |

TABLE 2-continued aspheric coefficients of the first embodiment
Table 2: aspheric coefficients

| | | | |
|---|---|---|---|
| A18 | 0.000000E+00 | 0.000000E+00 | 0.000000E+00 |
| A20 | 0.000000E+00 | 0.000000E+00 | 0.000000E+00 |

The values pertaining to the outline curve lengths may be obtained according to data in Table 1 and Table 2:

| First embodiment (primary reference wavelength used = 555 nm) | | | | | | |
|---|---|---|---|---|---|---|
| ARE | 1/2(HEP) | ARE value | ARE-1/2(HEP) | 2(ARE/HEP) % | TP | ARE/TP (%) |
| 11 | 0.950 | 0.958 | 0.008 | 100.87% | 0.750 | 127.69% |
| 12 | 0.950 | 0.987 | 0.037 | 103.91% | 0.750 | 131.53% |
| 21 | 0.950 | 0.976 | 0.026 | 102.74% | 0.895 | 108.99% |
| 22 | 0.950 | 0.954 | 0.004 | 100.42% | 0.895 | 106.52% |
| 31 | 0.950 | 0.949 | −0.001 | 99.94% | 0.932 | 101.83% |
| 32 | 0.950 | 0.959 | 0.009 | 100.93% | 0.932 | 102.84% |
| 41 | 0.950 | 0.953 | 0.003 | 100.29% | 1.816 | 52.45% |
| 42 | 0.950 | 0.970 | 0.020 | 102.15% | 1.816 | 53.42% |
| 51 | 0.950 | 0.995 | 0.045 | 104.71% | 0.645 | 154.24% |
| 52 | 0.950 | 0.949 | −0.001 | 99.92% | 0.645 | 147.18% |
| ARS | EHD | ARS value | ARS-EHD % | (ARS/EHD) % | TP | ARS/TP (%) |
| 11 | 3.459 | 4.210 | 0.751 | 121.71% | 0.750 | 561.03% |
| 12 | 2.319 | 3.483 | 1.165 | 150.24% | 0.750 | 464.19% |
| 21 | 1.301 | 1.384 | 0.084 | 106.43% | 0.895 | 154.61% |
| 22 | 1.293 | 1.317 | 0.024 | 101.87% | 0.895 | 147.09% |
| 31 | 1.400 | 1.447 | 0.047 | 103.39% | 0.932 | 155.22% |
| 32 | 1.677 | 1.962 | 0.285 | 116.97% | 0.932 | 210.45% |
| 41 | 2.040 | 2.097 | 0.057 | 102.82% | 1.816 | 115.48% |
| 42 | 2.338 | 2.821 | 0.483 | 120.67% | 1.816 | 155.32% |
| 51 | 2.331 | 2.971 | 0.639 | 127.43% | 0.645 | 460.64% |
| 52 | 3.219 | 3.267 | 0.049 | 101.51% | 0.645 | 506.66% |

Table 1 is the detailed structural data for the first embodiment in FIG. 1, wherein the unit of the curvature radius, the central thickness, the distance and the focal length is millimeters (mm), and surfaces 0-16 illustrate the surfaces in order from the object side to the image plane of the optical image capturing system. Table 2 shows the aspheric coefficients of the first embodiment, wherein k is the conic coefficient in the aspheric surface curve equation, and A1-A20 are the first to the twentieth order aspheric surface coefficients respectively. In addition, the tables of following embodiments exactly correspond to their respective schematic views and the diagrams of aberration curves, and the definitions of parameters therein are identical to those in the Table 1 and the Table 2 of the first embodiment, so that the repetitive details are not stated here.

Second Embodiment

Figure 2A:
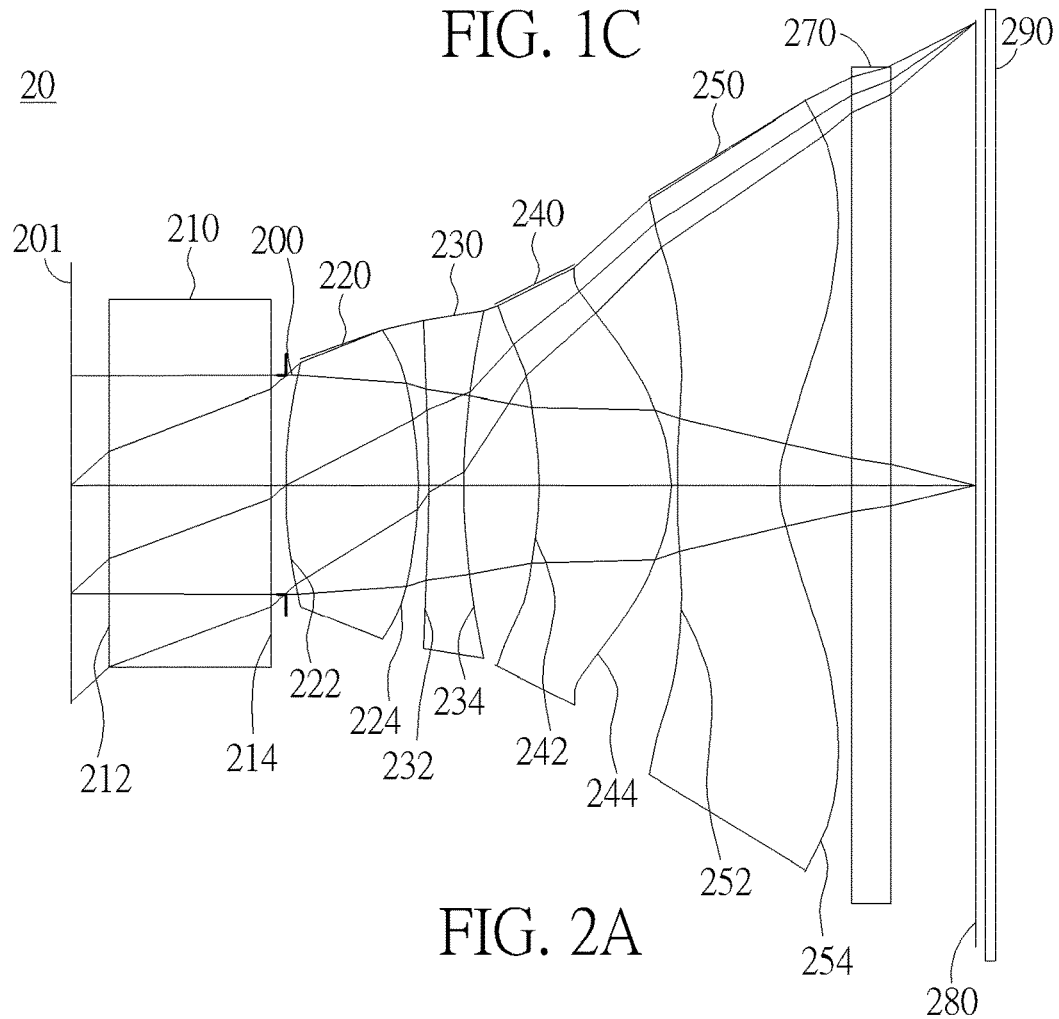
FIG. 2A is a schematic view of the optical image capturing system according to a second embodiment of the present disclosure.
Figure 2B:
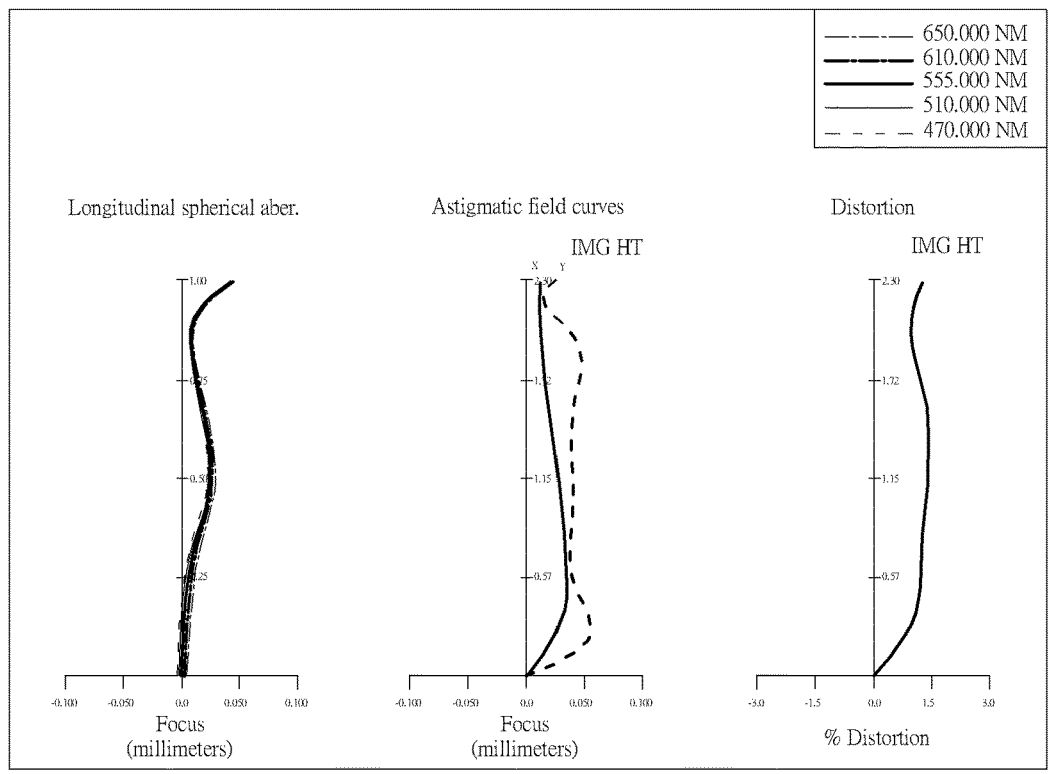
FIG. 2B is a curve diagram illustrating the spherical aberration, astigmatism and optical distortion of the optical image capturing system in sequence from left to right according to the second embodiment of the present disclosure.
Figure 2C:
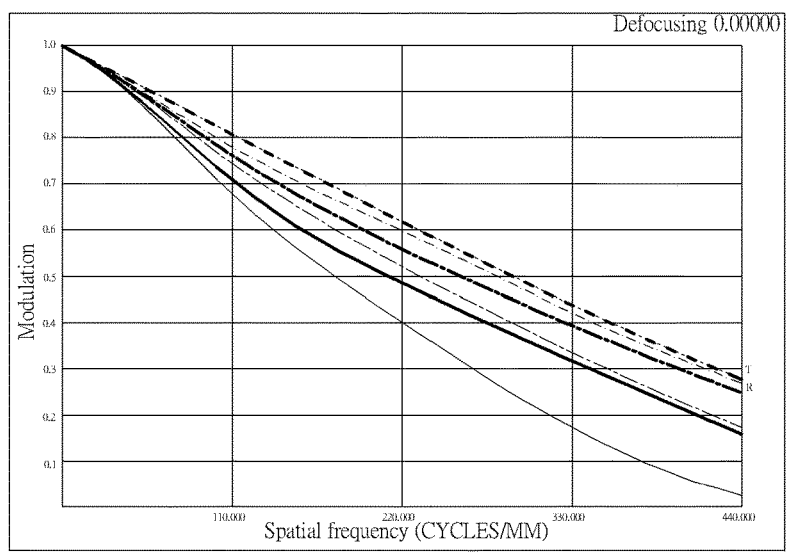
FIG. 2C is a characteristic diagram of modulation transfer of visible light spectrum according to the second embodiment of the present disclosure.
Figure 2C:
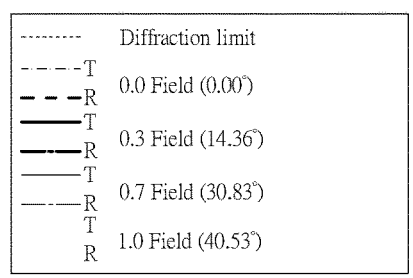

Please refer to FIGS. 2A and 2B, wherein FIG. 2A is a schematic view of the optical image capturing system according to the second embodiment of the present disclosure. FIG. 2B is a curve diagram illustrating the spherical aberration, astigmatism and optical distortion of the optical image capturing system in sequence from left to right according to the second embodiment of the present disclosure. FIG. 2C is a characteristic diagram of modulation transfer of visible light spectrum according to the second embodiment of the present disclosure. As shown in FIG. 2A, in the order from an object side to an image side, the optical image capturing system includes a first lens 210, an aperture 200, a second lens 220, a third lens 230, a fourth lens 240, a fifth lens 250, an infrared filter 270, an image plane 280, and an image sensing device 290.

An electronic device configured with the present embodiment may be provided with a light admitting opening 201 on the object side, wherein the light admitting opening 201 is configured to limit an optical path from the object side. The light admitting opening 201 has a diameter denoted as DDH, wherein DDH=1.967 mm. The light admitting opening 201 is at a distance of 0.2 mm away from a center of the first lens 210 (where the optical axis passes) on the object side.

The first lens 210 has positive refractive power and is made of glass material. The first lens 210 has a flat object-side surface 212 and a flat image-side surface 214, wherein both of the surfaces are plate glass and have a focal length of infinity (INF).

The second lens 220 has positive refractive power and is made of plastic material. The second lens 220 has a convex object-side surface 222 and a convex image-side surface 224, wherein both of the surfaces are aspheric. The object-side surface 222 has two inflection points and the image-side surface 224 has one inflection points The third lens 230 has negative refractive power and is made of plastic material. The third lens 230 has a concave object-side surface 232 and a concave image-side surface 234, wherein both of the surfaces are aspheric. The object-side surface 232 has three inflection points and the image-side surface 234 has one inflection point.

The fourth lens 240 has positive refractive power and is made of plastic material. The fourth lens 240 has a concave object-side surface 242 and a convex image-side surface 244, wherein both of the surfaces are aspheric. The object-side surface 242 has two inflection points and the image-side surface 244 has one inflection point.

The fifth lens 250 has negative refractive power and is made of plastic material. The fifth lens 250 has a convex object-side surface 252 and a concave image-side surface 254, wherein both of the surfaces are aspheric. The object-side surface 252 has two inflection points and the image-side surface 254 has one inflection point. Hence, the optical image capturing system is capable of effectively reducing an incident angle of the off-axis FOV rays, thereby further correcting an off-axis FOV aberration.

The infrared filter 270 is made of glass material and is configured between the fifth lens 250 and the image plane 280. The infrared filter 270 does not affect the focal length of the optical image capturing system.

Table 3 and Table 4 below should be incorporated into the reference of the present embodiment.

TABLE 3

Lens parameters of the second embodiment
f(focal length) = 2.6276 mm; f/HEP = 2.42; HAF(half angle of view) = 40.5655 deg.

| Surface No. | | Curvature Radius | Thickness (mm) | Material | Refractive Index | Abbe No. | Focal Length |
|---|---|---|---|---|---|---|---|
| 0 | Object | 1E+18 | 1E+18 | | | | |
| 1 | Lens 1 | 1E+18 | 0.900 | Plate glass | 2.001 | 25.44 | INF |
| 2 | | 1E+18 | 0.079 | | | | |
| 3 | Aperture | 1E+18 | −0.005 | | | | |
| 4 | Lens 2 | 2.011534376 | 0.724 | Plastic | 1.5365 | 55.885 | 2.096 |
| 5 | | −2.245428184 | 0.052 | | | | |
| 6 | Lens 3 | −15.16428761 | 0.201 | Plastic | 1.661 | 20.390 | −4.399 |
| 7 | | 3.656060391 | 0.411 | | | | |
| 8 | Lens 4 | −1.808139481 | 0.715 | Plastic | 1.5365 | 55.885 | 1.820 |
| 9 | | −0.723417212 | 0.035 | | | | |
| 10 | Lens 5 | 3.251740212 | 0.566 | Plastic | 1.5365 | 55.885 | −1.781 |
| 11 | | 0.695171313 | 0.385 | | | | |
| 12 | Infrared Filter | 1E+18 | 0.210 | NBK7 | | | |
| 13 | | 1E+18 | 0.468 | | | | |
| 14 | Image Plane | 1E+18 | 0.000 | | | | |

Reference wavelength = 555 nm; shield position: none

TABLE 4 aspheric coefficients of the second embodiment
Table 4: aspheric coefficients

| | Surface No. | | | | | | |
|---|---|---|---|---|---|---|---|
| | 1 | 2 | 4 | 5 | 6 | 7 | 8 |
| k | 0.000000E+00 | 0.000000E+00 | −1.055302E+02 | −3.320822E+01 | 6.823128E+01 | −1.283688E+02 | −6.261868E+00 |
| A4 | 0.000000E+00 | 0.000000E+00 | 1.544889E+00 | −3.488536E−01 | 1.360689E−01 | 4.729464E−01 | −1.447585E−01 |
| A6 | 0.000000E+00 | 0.000000E+00 | −1.699897E+01 | −7.916512E−01 | −3.006572E+00 | −3.038738E+00 | 1.974023E+00 |
| A8 | 0.000000E+00 | 0.000000E+00 | 1.541496E+02 | 5.191618E+00 | 1.770200E+01 | 1.535044E+01 | −1.902085E+01 |
| A10 | 0.000000E+00 | 0.000000E+00 | −1.007372E+03 | −1.159425E+01 | −6.806193E+01 | −6.057158E+01 | 9.696502E+01 |
| A12 | 0.000000E+00 | 0.000000E+00 | 4.418588E+03 | 1.622544E+01 | 1.960053E+02 | 1.714816E+02 | −3.034269E+02 |
| A14 | 0.000000E+00 | 0.000000E+00 | −1.251639E+04 | −2.196937E+01 | −3.795478E+02 | −3.175374E+02 | 5.921085E+02 |
| A16 | 0.000000E+00 | 0.000000E+00 | 2.173795E+04 | 1.619696E+01 | 4.337228E+02 | 3.589806E+02 | −7.040126E+02 |
| A18 | 0.000000E+00 | 0.000000E+00 | −2.095042E+04 | 0.000000E+00 | −2.531546E+02 | −2.230358E+02 | 4.694851E+02 |
| A20 | 0.000000E+00 | 0.000000E+00 | 8.605635E+03 | 0.000000E+00 | 5.494106E+01 | 5.778849E+01 | −1.350431E+02 |

| | Surface No. | | |
|---|---|---|---|
| | 9 | 10 | 11 |
| k | −1.026755E+00 | −2.075678E+02 | −4.716032E+00 |
| A4 | 4.291564E−01 | 1.362519E−01 | −1.427517E−01 |
| A6 | −5.381552E−01 | −1.060854E+00 | 7.674481E−02 |
| A8 | −4.410170E−01 | 2.231366E+00 | −1.617988E−02 |
| A10 | 2.499179E+00 | −2.724473E+00 | −1.282651E−02 |
| A12 | −2.705181E+00 | 2.085101E+00 | 1.184540E−02 |
| A14 | −5.703397E−01 | −1.000009E+00 | −4.688743E−03 |
| A16 | 3.188670E+00 | 2.898341E−01 | 1.071571E−03 |
| A18 | −2.135400E+00 | −4.599700E−02 | −1.390997E−04 |
| A20 | 4.396995E−01 | 3.026761E−03 | 7.991373E−06 |

In the second embodiment, the form of the aspheric surface equation therein is presented as that in the first embodiment. In addition, the definition of parameters in the following tables is equivalent to that in the first embodiment, so that the repetitive details are not stated here.

The following conditional values may be obtained according to the data in Table 3 and Table 4.

| Second embodiment (primary reference wavelength = 555 nm) | | | | | |
|---|---|---|---|---|---|
| ETP1 | ETP2 | ETP3 | ETP4 | ETP5 | BL |
| 0.900 | 0.578 | 0.258 | 0.616 | 0.686 | 1.0625 |
| ETP1/TP1 | ETP2/TP2 | ETP3/TP3 | ETP4/TP4 | ETP5/TP5 | EBL/BL |
| 1.000 | 0.798 | 1.286 | 0.862 | 1.211 | 0.8668 |
| ETL | EBL | EIN | EIR | PIR | EIN/ETL |
| 4.740 | 0.921 | 3.819 | 0.243 | 0.385 | 0.806 |
| SETP/EIN | EIR/PIR | SETP | STP | SETP/STP | SED/SIN |
| 0.796 | 0.633 | 3.038 | 3.106 | 0.978 | 1.366 |
| ED12 | ED23 | ED34 | ED45 | SED | SIN |
| 0.140 | 0.114 | 0.289 | 0.237 | 0.781 | 0.572 |
| ED12/IN12 | ED23/IN23 | ED34/IN34 | ED45/IN45 | | |
| 1.905 | 2.191 | 0.704 | 6.782 | | |
| |f/f1| | |f/f2| | |f/f3| | |f/f4| | |f/f5| | |f1/f2| |
| 0 | 1.25364 | 0.59730 | 1.44334 | 1.47550 | INF |
| ΣPPR | ΣNPR | ΣPPR/|ΣNPR| | IN12/f | IN45/f | |f2/f3| |
| 2.6970 | 0 | 0 | 0.0279 | 0.0133 | 0.4764 |
| TP3/(IN23 + TP3 + IN34) | | (TP1 + IN12)/TP2 | | (TP5 + IN45)/TP4 | |
| 0.30200 | | 1.34473 | | 0.84123 | |
| HOS | InTL | HOS/HOI | InS/HOS | ODT % | TDT % |
| 4.74000 | 3.67748 | 2.06356 | 0.79354 | 1.47256 | 0.419319 |
| HVT11 | HVT12 | HVT21 | HVT22 | HVT31 | HVT32 |
| 0 | 0 | 0 | 0 | 0 | 0 |
| HVT41 | HVT42 | HVT51 | HVT52 | HVT52/HOI | HVT52/HOS |
| 0 | 1.07048 | 0.57381 | 1.33326 | 0.24981 | 0.12106 |
| TP2/TP3 | TP3/TP4 | InRS51 | InRS52 | |InRS51|/TP5 | |InRS52|/TP5 |
| 3.60956 | 0.28044 | −0.150744 | 0.131004 | 0.26611 | 0.23126 |
| MTFQ0 | MTFQ3 | MTFQ7 | MTFH0 | MTFH3 | MTFH7 |
| 0.78 | 0.71 | 0.68 | 0.6 | 0.48 | 0.4 |

The following values may be obtained according to the data in Table 3 and Table 4.

| Values related to inflection point of second embodiment (primary reference wavelength = 555 nm) | | | | | |
|---|---|---|---|---|---|
| HIF211 | 0.5049 | HIF211/HOI | 0.2198 | SGI211 | 0.0584 | |SGI211|/(|SGI211| + TP2) | 0.0747 |
| HIF212 | 0.5833 | HIF212/HOI | 0.2539 | SGI212 | 0.0737 | |SGI212|/(|SGI212| + TP2) | 0.0925 |
| HIF221 | 0.7451 | HIF221/HOI | 0.3244 | SGI221 | −0.1761 | |SGI221|/(|SGI221| + TP2) | 0.1957 |
| HIF311 | 0.5291 | HIF311/HOI | 0.2304 | SGI311 | −0.0160 | |SGI311|/(|SGI311| + TP3) | 0.0738 |

-continued

| Values related to inflection point of second embodiment (primary reference wavelength = 555 nm) | | | | | | | |
|---|---|---|---|---|---|---|---|
| HIF312 | 0.6369 | HIF312/HOI | 0.2773 | SGI312 | −0.0237 | \|SGI312\|/(\|SGI312\| + TP3) | 0.1058 |
| HIF313 | 0.7277 | HIF313/HOI | 0.3168 | SGI313 | −0.0303 | \|SGI313\|/(\|SGI313\| + TP3) | 0.1314 |
| HIF321 | 0.7937 | HIF321/HOI | 0.3455 | SGI321 | 0.0864 | \|SGI321\|/(\|SGI321\| + TP3) | 0.3012 |
| HIF411 | 0.7630 | HIF411/HOI | 0.3322 | SGI411 | −0.1744 | \|SGI411\|/(\|SGI411\| + TP4) | 0.1961 |
| HIF412 | 0.8420 | HIF412/HOI | 0.3666 | SGI412 | −0.2131 | \|SGI412\|/(\|SGI412\| + TP4) | 0.2296 |
| HIF421 | 0.8508 | HIF421/HOI | 0.3704 | SGI421 | −0.4067 | \|SGI421\|/(\|SGI421\| + TP4) | 0.3626 |
| HIF511 | 0.3219 | HIF511/HOI | 0.1402 | SGI511 | 0.0121 | \|SGI511\|/(\|SGI511\| + TP5) | 0.0210 |
| HIF512 | 1.1808 | HIF512/HOI | 0.5141 | SGI512 | −0.0830 | \|SGI512\|/(\|SGI512\| + TP) | 0.1278 |
| HIF521 | 0.4930 | HIF521/HOI | 0.2146 | SGI521 | 0.1224 | \|SGI521\|/(\|SGI521\| + TP5) | 0.1777 |

Third Embodiment

Figure 3A:
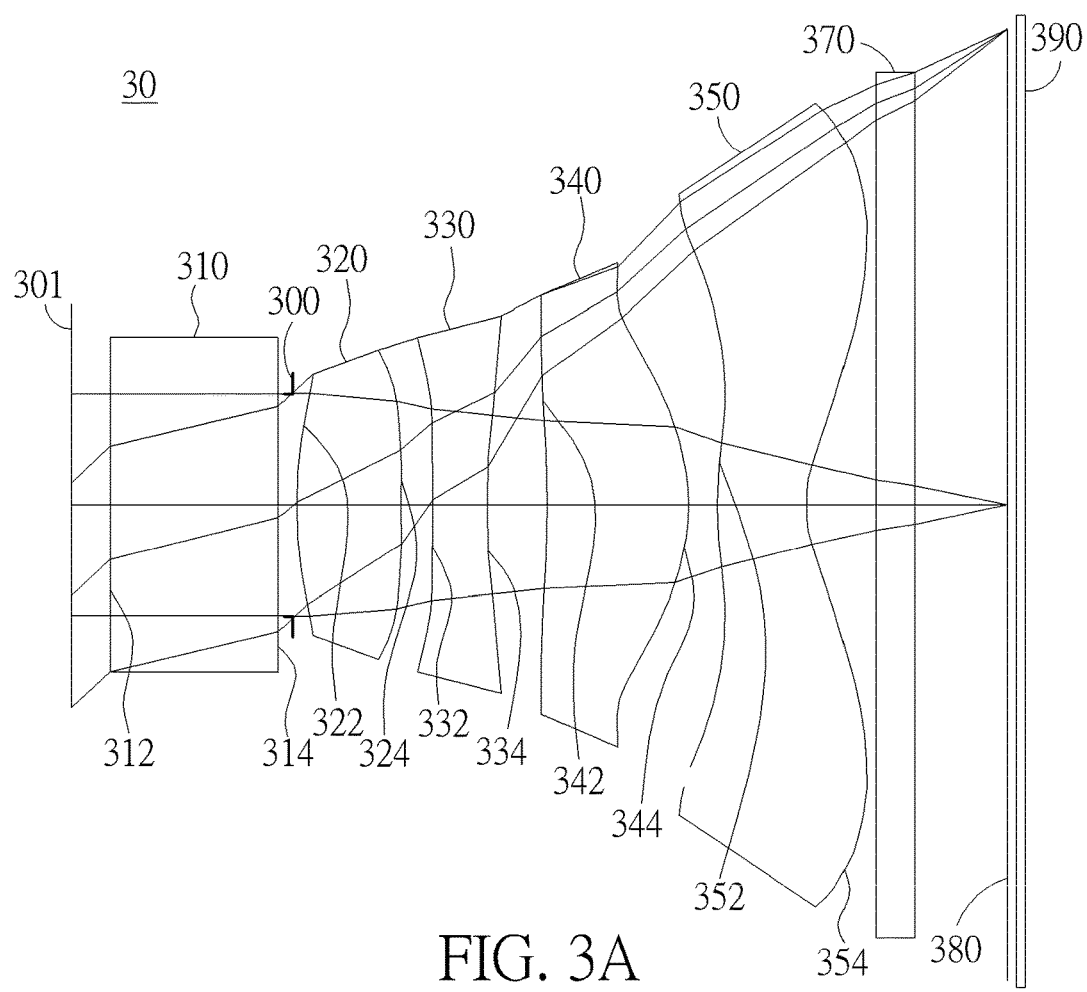
FIG. 3A is a schematic view of the optical image capturing system according to a third embodiment of the present disclosure.
Figure 3B:
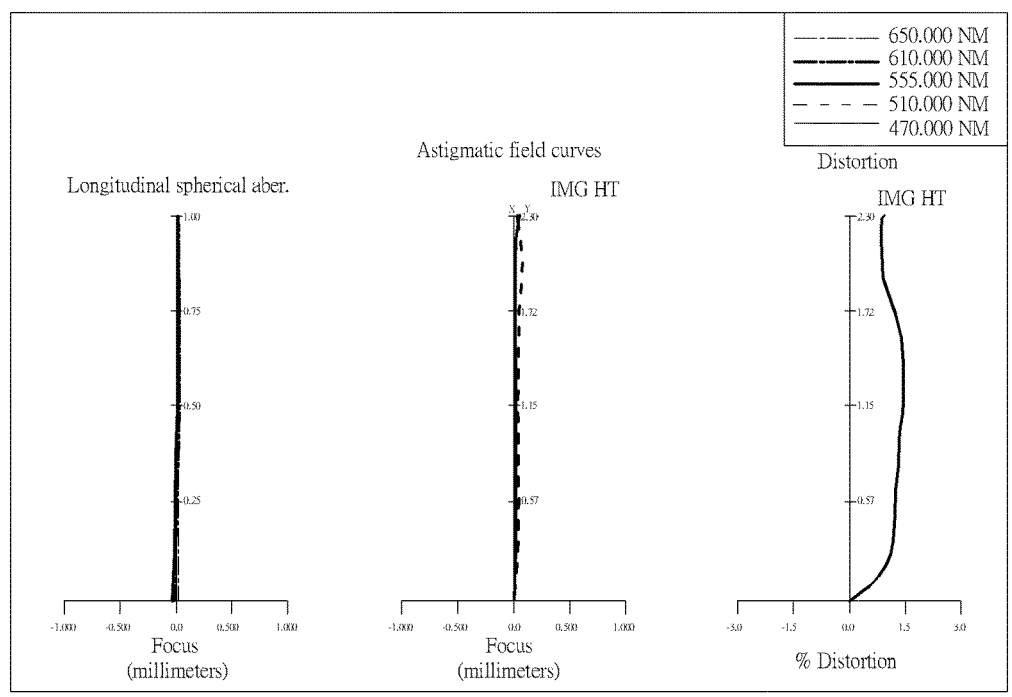
FIG. 3B is a curve diagram illustrating the spherical aberration, astigmatism and optical distortion of the optical image capturing system in sequence from left to right according to the third embodiment of the present disclosure.
Figure 3C:
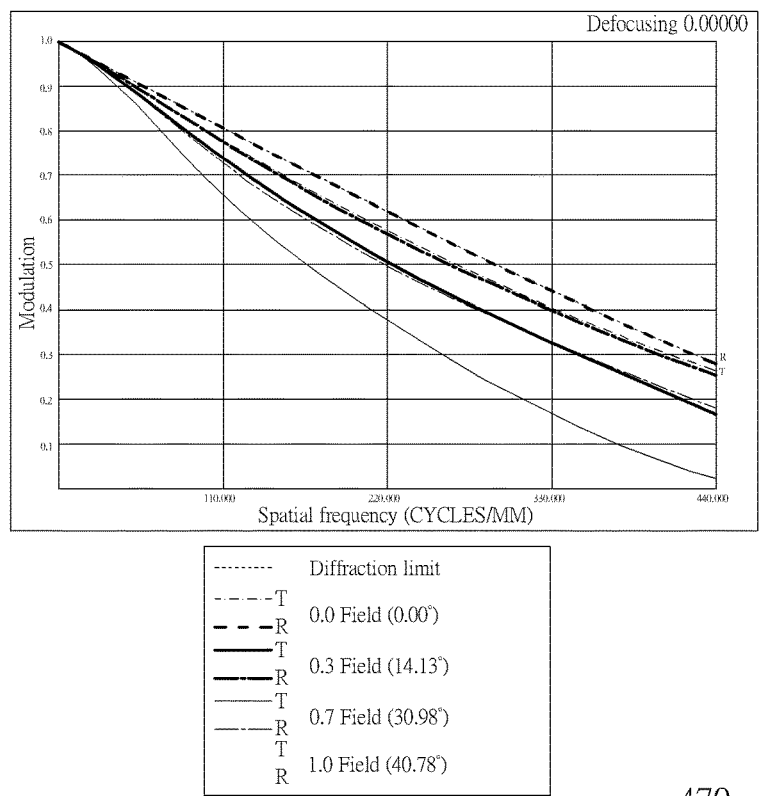
FIG. 3C is a characteristic diagram of modulation transfer of visible light spectrum according to the third embodiment of the present disclosure.

Please refer to FIGS. 3A and 3B, wherein FIG. 3A is a schematic view of the optical image capturing system according to the third embodiment of the present disclosure. FIG. 3B is a curve diagram illustrating the spherical aberration, astigmatism and optical distortion of the optical image capturing system in sequence from left to right according to the third embodiment of the present disclosure. FIG. 3C is a characteristic diagram of modulation transfer of visible light spectrum according to the third embodiment of the present disclosure. As shown in FIG. 3A, in the order from an object side to an image side, the optical image capturing system includes a first lens 310, an aperture 300, a second lens 320, a third lens 330, a fourth lens 340, a fifth lens 350, an infrared filter 370, an image plane 380 and an image sensing device 390.

An electronic device configured with the present embodiment may be provided with a light admitting opening 301 on the object side, wherein the light admitting opening 301 is configured to limit an optical path from the object side. The light admitting opening 301 has a diameter denoted as DDH, wherein DDH=1.962 mm. The light admitting opening 301 is at a distance of 0.2 mm away from a center of the first lens 310 (where the optical axis passes) on the object side.

The first lens 310 has positive refractive power and is made of glass material. The first lens 310 has a flat object-side surface 312 and a flat image-side surface 314, wherein both of the surfaces are plate glass and have a focal length of infinity (INF).

The second lens 320 has positive refractive power and is made of plastic material. The second lens 320 has a convex object-side surface 322 and a convex image-side surface 324, wherein both of the surfaces are aspheric. The object-side surface 322 has one inflection point.

The third lens 330 has negative refractive power and is made of plastic material. The third lens 330 has a convex object-side surface 332 and a concave image-side surface 334, wherein both of the surfaces are aspheric. The object-side surface 332 has two inflection points and the image-side surface 334 has three inflection points.

The fourth lens 340 has positive refractive power and is made of plastic material. The fourth lens 340 has a concave object-side surface 342 and a convex image-side surface 344, wherein both of the surfaces are aspheric. The object-side surface 342 has two inflection points and the image-side surface 344 has one inflection point.

The fifth lens 350 has negative refractive power and is made of plastic material. The fifth lens 350 has a convex object-side surface 352 and a concave image-side surface 354, wherein both of the surfaces are aspheric. The object-side surface 352 has two inflection points and the image-side surface 354 has one inflection point. In this manner, the back focal length may be reduced to maintain a miniaturized optical image capturing system.

The infrared filter 370 is made of glass material and is configured between the fifth lens 350 and the image plane 380. The infrared filter 370 does not affect the focal length of the optical image capturing system.

Table 5 and Table 6 below should be incorporated into the reference of the present embodiment.

TABLE 5

Lens parameters of the third embodiment
f(focal length) = 1.6610 mm; f/HEP = 2.42; HAF(half angle of view) = 40.6930 deg

| Surface No. | | Curvature Radius | Thickness (mm) | Material | Refractive Index | Abbe No. | Focal Length |
|---|---|---|---|---|---|---|---|
| 0 | Object | 1E+18 | 1E+18 | | | | |
| 1 | Lens 1 | 1E+18 | 0.900 | Plate glass | 2.998 | 90.36 | INF |
| 2 | | 1E+18 | 0.074 | | | | |
| 3 | Aperture | 1E+18 | 0.016 | | | | |
| 4 | Lens 2 | 1.937164325 | 0.551 | Plastic | 1.5365 | 55.885 | 3.242 |
| 5 | | −15.86643165 | 0.169 | | | | |
| 6 | Lens 3 | 7.043863879 | 0.296 | Plastic | 1.661 | 20.390 | −7.783 |
| 7 | | 2.937983091 | 0.305 | | | | |
| 8 | Lens 4 | −4.653757573 | 0.760 | Plastic | 1.5365 | 55.885 | 2.128 |
| 9 | | −0.971581623 | 0.153 | | | | |
| 10 | Lens 5 | 1.53438413 | 0.470 | Plastic | 1.5365 | 55.885 | −2.427 |
| 11 | | 0.629922364 | 0.366 | | | | |
| 12 | Infrared Filter | 1E+18 | 0.210 | BK_7 | 1.517 | 23.89 | |

TABLE 5-continued

Lens parameters of the third embodiment
f(focal length) = 1.6610 mm; f/HEP = 2.42; HAF(half angle of view) = 40.6930 deg

| Surface No. | Curvature Radius | Thickness (mm) | Material | Refractive Index | Abbe No. | Focal Length |
|---|---|---|---|---|---|---|
| 13 | | 1E+18 | 0.480 | | | |
| 14 | Image Plane | 1E+18 | 0.000 | | | |

Reference wavelength = 555 nm; shield position: the 6th surface with clear aperture of 0.815 mm

TABLE 6 aspheric coefficients of the third embodiment
Table 6: aspheric coefficients

| | Surface No. | | | | | | |
|---|---|---|---|---|---|---|---|
| | 1 | 2 | 4 | 5 | 6 | 7 | 8 |
| k | 0.000000E+00 | 0.000000E+00 | −4.004687E+00 | 3.608762E+02 | −4.000000E+02 | −6.334555E+01 | −4.508144E+01 |
| A4 | 0.000000E+00 | 0.000000E+00 | 9.129850E−02 | −2.688215E−01 | −1.988497E−01 | 2.890325E−01 | 1.560892E−01 |
| A6 | 0.000000E+00 | 0.000000E+00 | −1.820015E+00 | −2.121676E−01 | −1.931647E+00 | −2.623986E+00 | −1.201041E−01 |
| A8 | 0.000000E+00 | 0.000000E+00 | 1.881727E+01 | −1.992862E+00 | 1.222278E+01 | 1.250039E+01 | −1.148695E+00 |
| A10 | 0.000000E+00 | 0.000000E+00 | −1.184064E+02 | 2.957956E+01 | −5.702452E+01 | −4.256193E+01 | 6.919439E+00 |
| A12 | 0.000000E+00 | 0.000000E+00 | 4.221946E+02 | −1.501775E+02 | 2.006252E+02 | 1.009215E+02 | −1.966532E+01 |
| A14 | 0.000000E+00 | 0.000000E+00 | −7.390495E+02 | 4.195713E+02 | −4.571782E+02 | −1.565431E+02 | 3.244420E+01 |
| A16 | 0.000000E+00 | 0.000000E+00 | 1.156617E+02 | −6.931005E+02 | 6.222761E+02 | 1.494190E+02 | −3.122865E+01 |
| A18 | 0.000000E+00 | 0.000000E+00 | 1.492940E+03 | 6.340423E+02 | −4.572885E+02 | −7.915878E+01 | 1.623600E+01 |
| A20 | 0.000000E+00 | 0.000000E+00 | −1.521109E+03 | −2.452217E+02 | 1.391861E+02 | 1.773861E+01 | −3.533914E+00 |

| | Surface No. | | |
|---|---|---|---|
| | 9 | 10 | 11 |
| k | −2.073341E+00 | −4.639375E+01 | −4.452086E+00 |
| A4 | −4.079969E−01 | −2.202709E−01 | −1.585045E−01 |
| A6 | 2.935648E+00 | 1.219414E−01 | 7.984346E−02 |
| A8 | −1.145722E+01 | −3.318289E−01 | 4.333790E−05 |
| A10 | 2.773957E+01 | 8.789094E−01 | −3.976581E−02 |
| A12 | −4.238360E+01 | −1.218423E+00 | 3.344777E−02 |
| A14 | 4.089886E+01 | 9.475739E−01 | −1.472892E−02 |
| A16 | −2.402211E+01 | −4.176133E−01 | 3.799070E−03 |
| A18 | 7.818257E+00 | 9.754443E−02 | −5.402033E−04 |
| A20 | −1.081024E+00 | −9.394648E−03 | 3.261679E−05 |

In the third embodiment, the form of the aspheric surface equation therein is presented as that in the first embodiment. In addition, the definition of parameters in the following tables is equivalent to that in the first embodiment, so that the repetitive details are not stated here.

The following values for the conditional expressions may be obtained from the data in Table 5 and Table 6.

| Third embodiment (primary reference wavelength = 555 nm) | | | | | |
|---|---|---|---|---|---|
| ETP1 | ETP2 | ETP3 | ETP4 | ETP5 | BL |
| 0.900 | 0.443 | 0.348 | 0.631 | 0.585 | 1.0565 |
| ETP1/TP1 | ETP2/TP2 | ETP3/TP3 | ETP4/TP4 | ETP5/TP5 | EBL/BL |
| 1.000 | 0.805 | 1.178 | 0.830 | 1.244 | 0.8566 |
| ETL | EBL | EIN | EIR | PIR | EIN/ETL |
| 4.750 | 0.905 | 3.845 | 0.215 | 0.366 | 0.809 |
| SETP/EIN | EIR/PIR | SETP | STP | SETP/STP | SED/SIN |
| 0.756 | 0.587 | 2.907 | 2.977 | 0.977 | 1.307 |

-continued

| Third embodiment (primary reference wavelength = 555 nm) | | | | | |
|---|---|---|---|---|---|
| ED12 | ED23 | ED34 | ED45 | SED | SIN |
| 0.160 | 0.190 | 0.249 | 0.338 | 0.937 | 0.717 |
| ED12/IN12 | ED23/IN23 | ED34/IN34 | ED45/IN45 | | |
| 1.787 | 1.126 | 0.816 | 2.204 | | |
| \|f/f1\| | f/f2 | \|f/f3\| | \|f/f4\| | \|f/f5\| | \|f1/f2\| |
| 0 | 0.81080 | 0.33778 | 1.23561 | 1.08333 | INF |
| ΣPPR | ΣNPR | ΣPPR/\|ΣNPR\| | IN12/f | IN45/f | \|f2/f3\| |
| 3.1297 | 0 | 0 | 0.0342 | 0.0583 | 0.4166 |
| TP3/(IN23 + TP3 + IN34) | | (TP1 + IN12)/TP2 | | (TP5 + IN45)/TP4 | |
| 0.38439 | | 1.79775 | | 0.82032 | |
| HOS | InTL | HOS/HOI | InS/HOS | ODT % | TDT % |
| 4.75000 | 3.69354 | 2.06791 | 0.79501 | 1.42365 | 0.625041 |
| HVT11 | HVT12 | HVT21 | HVT22 | HVT31 | HVT32 |
| 0 | 0 | 0 | 0 | 0.288619 | 0 |
| HVT41 | HVT42 | HVT51 | HVT52 | HVT52/HOI | HVT52/HOS |
| 0.76304 | 1.07520 | 0.57003 | 1.30625 | 0.24816 | 0.12001 |
| TP2/TP3 | TP3/TP4 | InRS51 | InRS52 | \|InRS51\|/TP5 | \|InRS52\|/TP5 |
| 1.86077 | 0.38932 | −0.198943 | 0.0933008 | 0.42316 | 0.19845 |
| MTFQ0 | MTFQ3 | MTFQ7 | MTFH0 | MTFH3 | MTFH7 |
| 0.78 | 0.74 | 0.65 | 0.58 | 0.51 | 0.38 |

The following values may be obtained according to the data in Table 5 and Table 6.

| Values related to inflection point of third embodiment (primary reference wavelength = 555 nm) | | | | | | | |
|---|---|---|---|---|---|---|---|
| HIF211 | 0.5353 | HIF211/HOI | 0.2330 | SGI211 | 0.0684 | \|SGI211\|/(\|SGI211\| + TP2) | 0.1106 |
| HIF311 | 0.1699 | HIF311/HOI | 0.0740 | SGI311 | 0.0017 | \|SGI311\|/(\|SGI311\| + TP3) | 0.0058 |
| HIF312 | 0.7017 | HIF312/HOI | 0.3055 | SGI312 | −0.0494 | \|SGI312\|/(\|SGI312\| + TP3) | 0.1431 |
| HIF321 | 0.4065 | HIF321/HOI | 0.1770 | SGI321 | 0.0244 | \|SGI321\|/(\|SGI321\| + TP3) | 0.0762 |
| HIF322 | 0.6883 | HIF322/HOI | 0.2997 | SGI322 | 0.0484 | \|SGI322\|/(\|SGI322\| + TP3) | 0.1407 |
| HIF323 | 0.8768 | HIF323/HOI | 0.3817 | SGI323 | 0.0639 | \|SGI323\|/(\|SGI323\| + TP3) | 0.1776 |
| HIF411 | 0.3671 | HIF411/HOI | 0.1598 | SGI411 | −0.0112 | \|SGI411\|/(\|SGI411\| + TP4) | 0.0146 |
| HIF412 | 0.9063 | HIF412/HOI | 0.3946 | SGI412 | −0.0205 | \|SGI412\|/(\|SGI412\| + TP4) | 0.0263 |
| HIF421 | 0.7422 | HIF421/HOI | 0.3231 | SGI421 | −0.2549 | \|SGI421\|/(\|SGI421\| + TP4) | 0.2512 |
| HIF511 | 0.2684 | HIF511/HOI | 0.1168 | SGI511 | 0.0173 | \|SGI511\|/(\|SGI511\| + TP5) | 0.0356 |
| HIF512 | 1.1659 | HIF512/HOI | 0.5076 | SGI512 | −0.0976 | \|SGI512\|/(\|SGI512\| + TP5) | 0.1719 |
| HIF521 | 0.4736 | HIF521/HOI | 0.2062 | SGI521 | 0.1239 | \|SGI521\|/(\|SGI521\| + TP5) | 0.2086 |

Fourth Embodiment

Figure 4A:
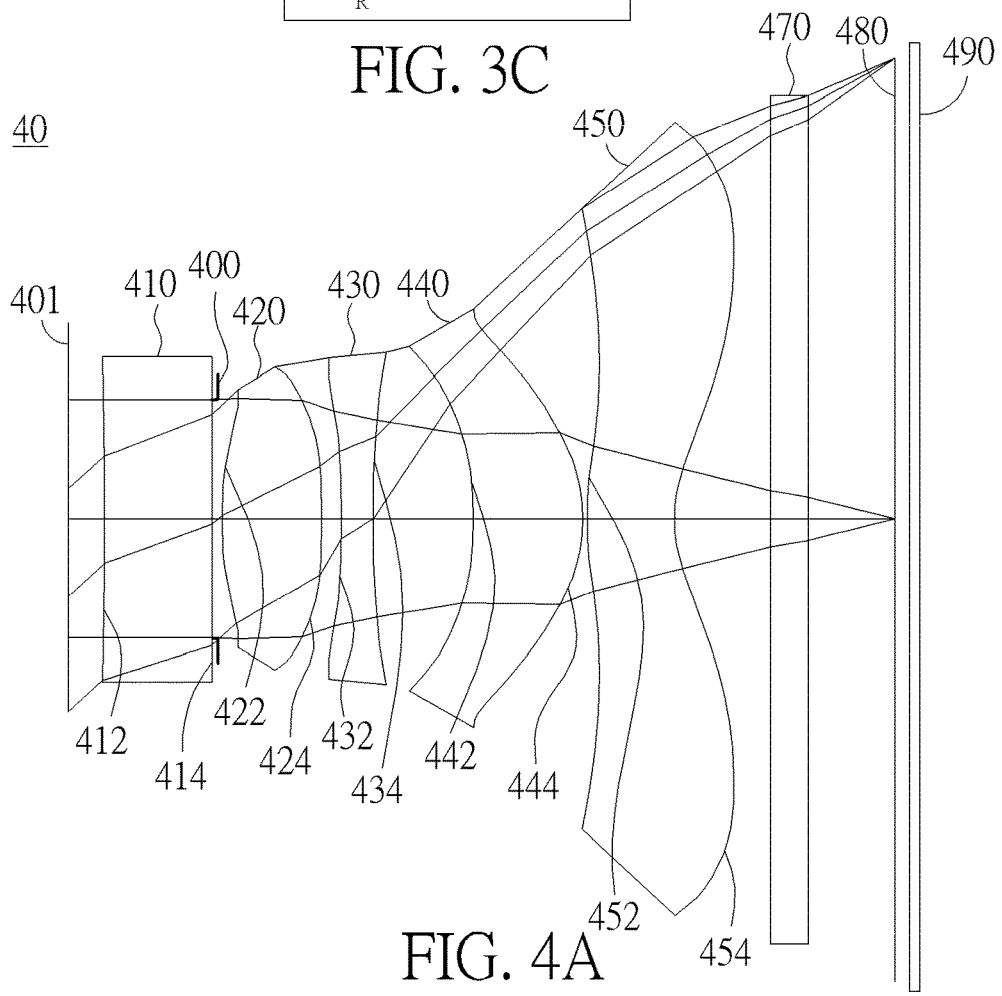
FIG. 4A is a schematic view of the optical image capturing system according to a fourth embodiment of the present disclosure.
Figure 4B:
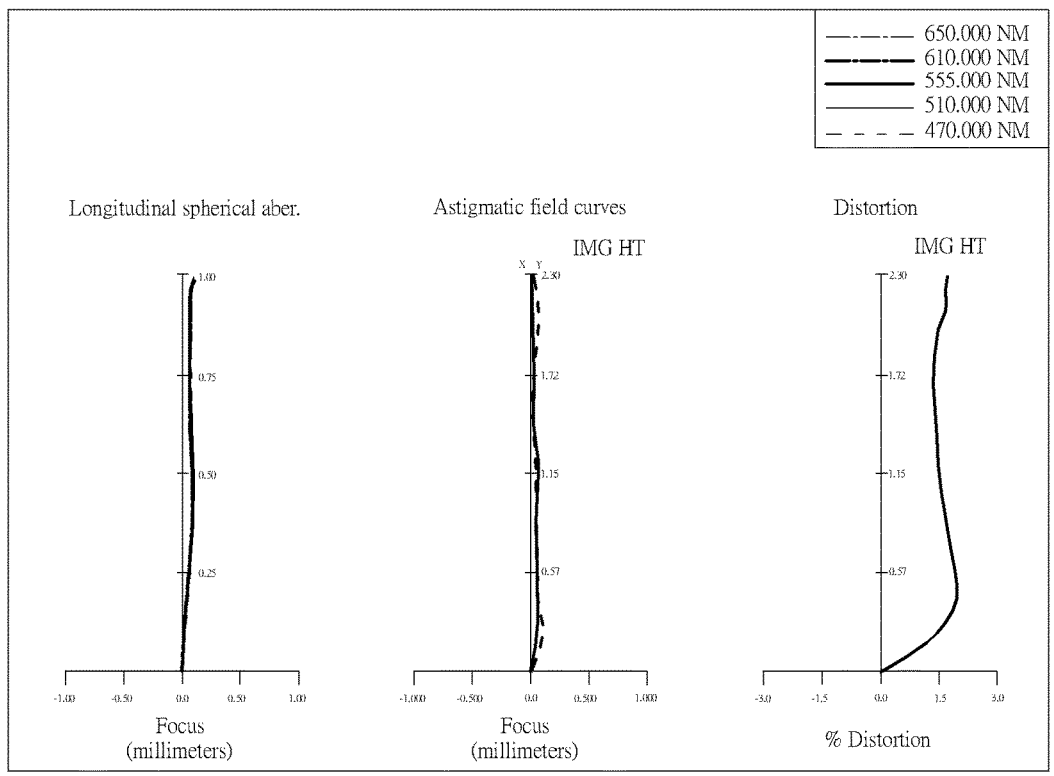
FIG. 4B is a curve diagram illustrating the spherical aberration, astigmatism and optical distortion of the optical image capturing system in sequence from left to right according to the fourth embodiment of the present disclosure.
Figure 4C:
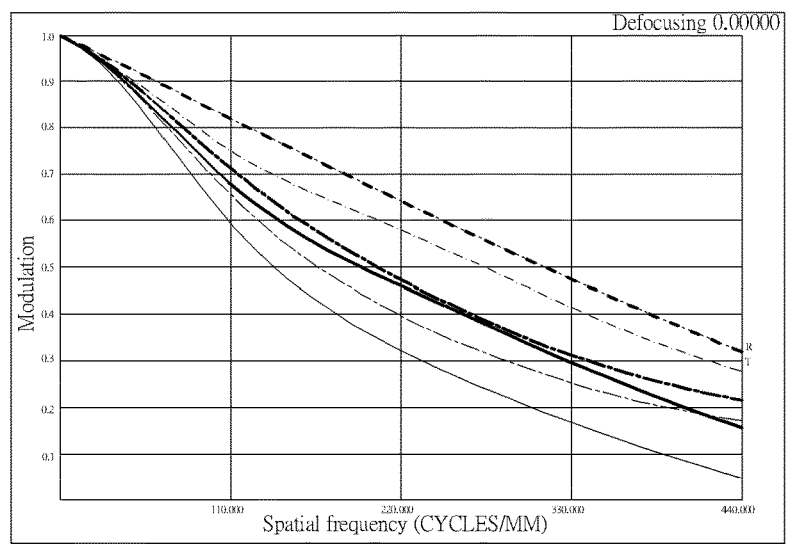
FIG. 4C is a characteristic diagram of modulation transfer of visible light spectrum according to the fourth embodiment of the present disclosure.
Figure 4C:
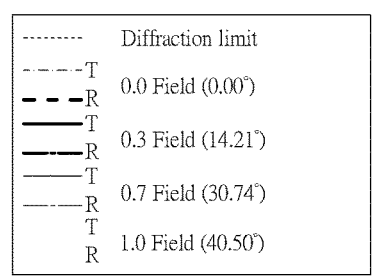

Please refer to FIGS. 4A and 4B, wherein FIG. 4A is a schematic view of the optical image capturing system according to the fourth embodiment of the present disclosure. FIG. 4B is a curve diagram illustrating the spherical aberration, astigmatism and optical distortion of the optical image capturing system in sequence from left to right according to the fourth embodiment of the present disclosure. FIG. 4C is a characteristic diagram of modulation transfer of visible light spectrum according to the fourth embodiment of the present disclosure. As shown in FIG. 4A, in the order from an object side to an image side, the optical image capturing system includes a first lens 410, an aperture 400, a second lens 420, a third lens 430, a fourth lens 440, a fifth lens 450, an infrared filter 470, an image plane 480 and an image sensing device 490.

An electronic device configured with the present embodiment may be provided with a light admitting opening 401 on the object side, wherein the light admitting opening 401 is configured to limit an optical path from the object side. The light admitting opening 401 has a diameter denoted as DDH, wherein DDH=1.950 mm. The light admitting opening 401 is at a distance of 0.2 mm away from a center of the first lens 410 (where the optical axis passes) on the object side.

The first lens 410 has negative refractive power and is made of glass material. The first lens 410 has a concave object-side surface 412 and a convex image-side surface 414, wherein both of the surfaces are spherical surfaces.

The second lens 420 has positive refractive power and is made of plastic material. The second lens 420 has a convex object-side surface 422 and a convex image-side surface 424, wherein both of the surfaces are aspheric. The object-side surface 422 has one inflection point.

The third lens 430 has negative refractive power and is made of plastic material. The third lens 430 has a convex object-side surface 432 and a concave image-side surface 434, wherein both of the surfaces are aspheric. The object-side surface 432 and image-side surface 434 each has one inflection point.

The fourth lens 440 has positive refractive power and is made of plastic material. The fourth lens 440 has a concave object-side surface 442 and a convex image-side surface 444, wherein both of the surfaces are aspheric. The image-side surface 444 has one inflection point.

The fifth lens 450 has negative refractive power and is made of plastic material. The fifth lens 450 has a convex object-side surface 452 and a concave image-side surface 454, wherein both of the surfaces are aspheric. The object-side surface 452 has two inflection points and the image-side surface 454 has one inflection point. In this manner, the back focal length may be reduced to maintain a miniaturized optical image capturing system.

The infrared filter 470 is made of glass material and is configured between the fifth lens 450 and the image plane 480. The infrared filter 470 does not affect the focal length of the optical image capturing system.

Table 7 and Table 8 below should be incorporated into the reference of the present embodiment.

TABLE 7

Lens parameters of the fourth embodiment
f(focal length) = 2.5897 mm; f/HEP = 2.2; HAF(half angle of view) = 40.5343 deg

| Surface No. | | Curvature Radius | Thickness (mm) | Material | Refractive Index | Abbe No. | Focal Length |
|---|---|---|---|---|---|---|---|
| 0 | Object | 1E+18 | 1E+18 | | | | |
| 1 | Lens 1 | −25.68211561 | 0.587 | Spherical glass | 2.003 | 19.32 | −26.922 |
| 2 | | −452.9188181 | 0.031 | | | | |
| 3 | Aperture | 1E+18 | 0.025 | | | | |
| 4 | Lens 2 | 1.636186131 | 0.540 | Plastic | 1.5365 | 55.885 | 1.938 |
| 5 | | −2.547083864 | 0.103 | | | | |
| 6 | Lens 3 | −4.213627475 | 0.180 | Plastic | 1.661 | 20.390 | −4.367 |
| 7 | | 9.587418313 | 0.545 | | | | |
| 8 | Lens 4 | −1.280120016 | 0.597 | Plastic | 1.5365 | 55.885 | 1.823 |
| 9 | | −0.646111847 | 0.026 | | | | |
| 10 | Lens 5 | 1.746417267 | 0.477 | Plastic | 1.5365 | 55.885 | −1.896 |
| 11 | | 0.582650206 | 0.516 | | | | |
| 12 | Infrared Filter | 1E+18 | 0.210 | BK_7 | | | |
| 13 | | 1E+18 | 0.470 | | | | |
| 14 | Image Plane | 1E+18 | 0.000 | | | | |

Reference wavelength = 555 nm; shield position: none

TABLE 8 aspheric coefficients of the fourth embodiment
Table 8: aspheric coefficients

| | Surface No. | | | | | | |
|---|---|---|---|---|---|---|---|
| | 1 | 2 | 4 | 5 | 6 | 7 | 8 |
| k | 0.000000E+00 | 0.000000E+00 | −9.000000E+01 | −4.179177E+01 | −1.240665E+01 | −7.145282E+01 | −3.813175E+00 |
| A4 | 0.000000E+00 | 0.000000E+00 | 2.116588E+00 | −4.746240E−01 | 2.190431E−01 | 4.006262E−01 | −1.483023E−01 |
| A6 | 0.000000E+00 | 0.000000E+00 | −2.294091E+01 | 5.457210E−01 | −3.216607E+00 | −3.047226E+00 | 2.184990E+00 |
| A8 | 0.000000E+00 | 0.000000E+00 | 1.939295E+02 | −3.872710E+00 | 2.042695E+01 | 1.838657E+01 | −2.231008E+01 |
| A10 | 0.000000E+00 | 0.000000E+00 | −1.173493E+03 | 1.571063E+01 | −9.137068E+01 | −7.697066E+01 | 1.103703E+02 |
| A12 | 0.000000E+00 | 0.000000E+00 | 4.799350E+03 | −3.952302E+01 | 2.676579E+02 | 2.094360E+02 | −3.289199E+02 |
| A14 | 0.000000E+00 | 0.000000E+00 | −1.292622E+04 | 5.556552E+01 | −4.711495E+02 | −3.585846E+02 | 6.141566E+02 |
| A16 | 0.000000E+00 | 0.000000E+00 | 2.186061E+04 | −3.469150E+01 | 4.759311E+02 | 3.759362E+02 | −7.109697E+02 |
| A18 | 0.000000E+00 | 0.000000E+00 | −2.095042E+04 | 0.000000E+00 | −2.531546E+02 | −2.230358E+02 | 4.694851E+02 |
| A20 | 0.000000E+00 | 0.000000E+00 | 8.605635E+03 | 0.000000E+00 | 5.494106E+01 | 5.778849E+01 | −1.350431E+02 |

| | Surface No. | | |
|---|---|---|---|
| | 9 | 10 | 11 |
| k | −1.065567E+00 | −6.310036E+01 | −4.434590E+00 |
| A4 | 4.170021E−01 | 2.445498E−01 | −2.090587E−01 |
| A6 | 8.267346E−02 | −1.362306E+00 | 1.589141E−01 |
| A8 | −3.493462E+00 | 2.794658E+00 | −6.345506E−02 |
| A10 | 9.250276E+00 | −3.271084E+00 | −4.245356E−04 |
| A12 | −1.054640E+01 | 2.368315E+00 | 1.133086E−02 |

TABLE 8-continued aspheric coefficients of the fourth embodiment
Table 8: aspheric coefficients

| | | | |
|---|---|---|---|
| A14 | 4.005367E+00 | −1.075936E+00 | −5.057052E−03 |
| A16 | 2.144735E+00 | 2.981314E−01 | 1.120685E−03 |
| A18 | −2.135400E+00 | −4.599700E−02 | −1.390998E−04 |
| A20 | 4.396995E−01 | 3.026761E−03 | 7.991373E−06 |

In the fourth embodiment, the form of the aspheric surface equation therein is presented as that in the first embodiment. In addition, the definition of parameters in the following tables is equivalent to that in the first embodiment, so that the repetitive details are not stated here.

The following values for the conditional expressions may be obtained from the data in Table 7 and Table 8.

The following values may be obtained according to the data in Table 7 and Table 8.

| Fourth embodiment (primary reference wavelength = 555 nm) | | | | | |
|---|---|---|---|---|---|
| ETP1 | ETP2 | ETP3 | ETP4 | ETP5 | BL |
| 0.594 | 0.351 | 0.257 | 0.501 | 0.597 | 1.1956 |
| ETP1/TP1 | ETP2/TP2 | ETP3/TP3 | ETP4/TP4 | ETP5/TP5 | EBL/BL |
| 1.011 | 0.651 | 1.424 | 0.839 | 1.252 | 0.8556 |
| ETL | EBL | EIN | EIR | PIR | EIN/ETL |
| 4.314 | 1.023 | 3.290 | 0.343 | 0.516 | 0.763 |
| SETP/EIN | EIR/PIR | SETP | STP | SETP/STP | SED/SIN |
| 0.703 | 0.231 | 2.300 | 2.381 | 0.966 | 1.357 |
| ED12 | ED23 | ED34 | ED45 | SED | SIN |
| 0.140 | 0.161 | 0.378 | 0.311 | 0.991 | 0.730 |
| ED12/IN12 | ED23/IN23 | ED34/IN34 | ED45/IN45 | | |
| 2.516 | 1.565 | 0.694 | 11.966 | | |
| |f/f1| | |f/f2| | |f/f3| | |f/f4| | |f/f5| | |f1/f2| |
| 0.09619 | 1.33601 | 0.59301 | 1.42071 | 1.36567 | 13.88909 |
| ΣPPR | ΣNPR | ΣPPR/|ΣNPR| | IN12/f | IN45/f | |f2/f3| |
| 4.1224 | 0.6892 | 5.9814 | 0.0215 | 0.0100 | 0.4439 |
| TP3/(IN23 + TP3 + IN34) | | (TP1 + IN12)/TP2 | | (TP5 + IN45)/TP4 | |
| 0.21768 | | 1.19147 | | 0.84176 | |
| HOS | InTL | HOS/HOI | InS/HOS | ODT % | TDT % |
| 4.30675 | 3.11117 | 1.87495 | 0.85648 | 1.97587 | 0.483167 |
| HVT11 | HVT12 | HVT21 | HVT22 | HVT31 | HVT32 |
| 0 | 0 | 0.626039 | 0 | 0.787493 | 0 |
| HVT41 | HVT42 | HVT51 | HVT52 | HVT52/HOI | HVT52/HOS |
| 0 | 0 | 0.81852 | 1.31772 | 0.35634 | 0.19006 |
| TP2/TP3 | TP3/TP4 | InRS51 | InRS52 | |InRS51|/TP5 | |InRS52|/TP5 |
| 2.99359 | 0.30187 | −0.034535 | 0.100597 | 0.07243 | 0.21099 |
| MTFE0 | MTFE3 | MTFE7 | MTFQ0 | MTFQ3 | MTFQ7 |
| 0.75 | 0.68 | 0.59 | 0.58 | 0.46 | 0.33 |

Values related to inflection point of fourth embodiment
(primary reference wavelength = 555 nm)

| | | | | | | | |
|---|---|---|---|---|---|---|---|
| HIF211 | 0.4570 | HIF211/HOI | 0.1990 | SGI211 | 0.0583486 | \|SGI211\|/(\|SGI211\| + TP2) | 0.0976 |
| HIF311 | 0.5685 | HIF311/HOI | 0.2475 | SGI311 | −0.042474 | \|SGI311\|/(\|SGI311\| + TP3) | 0.1907 |
| HIF321 | 0.7848 | HIF321/HOI | 0.3417 | SGI321 | 0.0637 | \|SGI321\|/(\|SGI321\| + TP3) | 0.2611 |
| HIF421 | 0.8684 | HIF421/HOI | 0.3781 | SGI421 | −0.470579 | \|SGI421\|/(\|SGI421\| + TP4) | 0.4407 |
| HIF511 | 0.3830 | HIF511/HOI | 0.1667 | SGI511 | 0.0300871 | \|SGI511\|/(\|SGI511\| + TP5) | 0.0594 |
| HIF512 | 1.4890 | HIF512/HOI | 0.6482 | SGI512 | −0.0217 | \|SGI512\|/(\|SGI512\| + TP5) | 0.0435 |
| HIF521 | 0.4419 | HIF521/HOI | 0.1924 | SGI521 | 0.11612 | \|SGI521\|/(\|SGI521\| + TP5) | 0.1958 |

Fifth Embodiment

Figure 5A:
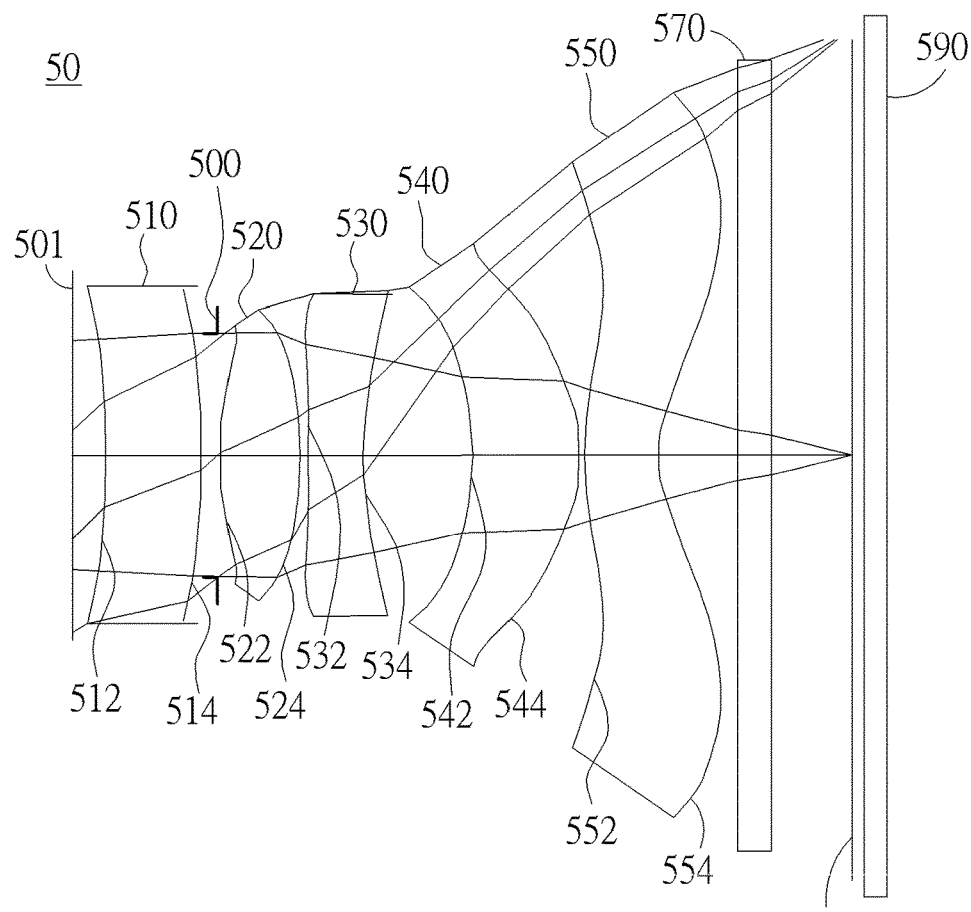
FIG. 5A is a schematic view of the optical image capturing system according to a fifth embodiment of the present disclosure.
Figure 5B:
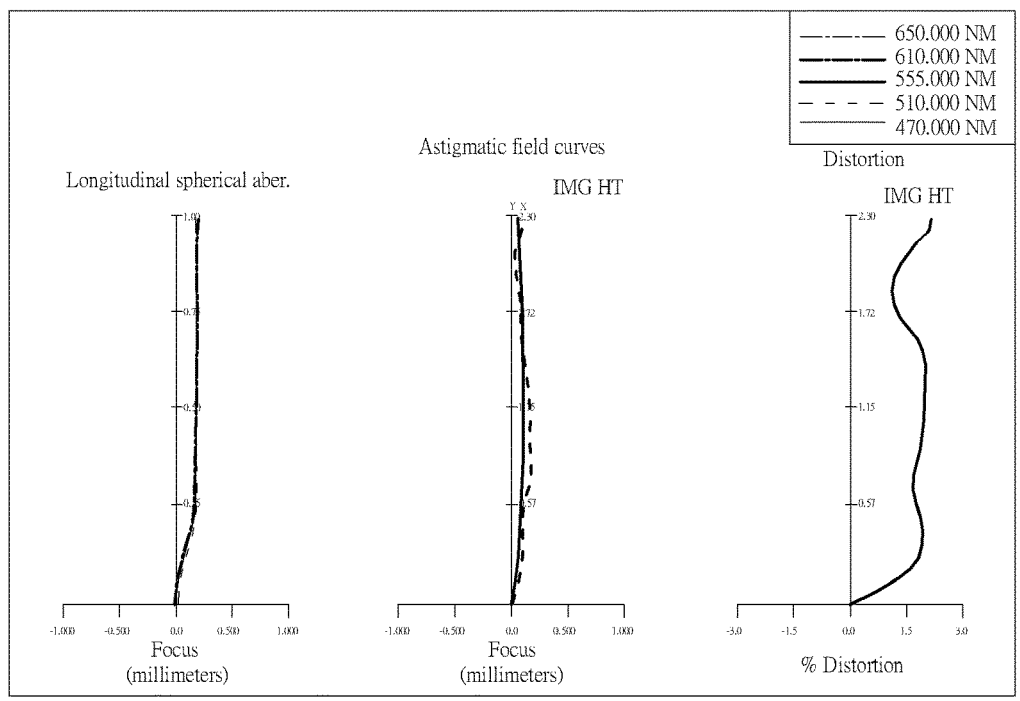
FIG. 5B is a curve diagram illustrating the spherical aberration, astigmatism and optical distortion of the optical image capturing system in the sequence from left to right according to the fifth embodiment of the present disclosure.
Figure 5C:
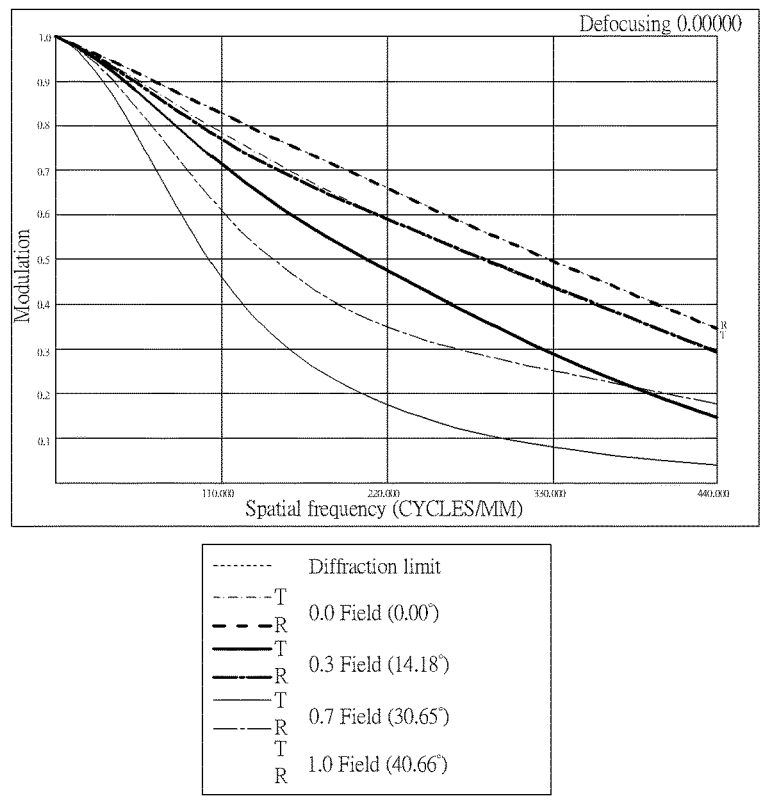
FIG. 5C is a characteristic diagram of modulation transfer of visible light spectrum according to the fifth embodiment of the present disclosure.

Please refer to FIGS. 5A and 5B, wherein FIG. 5A is a schematic view of the optical image capturing system according to the fifth embodiment of the present disclosure. FIG. 5B is a curve diagram illustrating the spherical aberration, astigmatism and optical distortion of the optical image capturing system in sequence from left to right according to the fifth embodiment of the present disclosure. FIG. 5C is a characteristic diagram of modulation transfer of visible light spectrum according to the fifth embodiment of the present disclosure. As shown in FIG. 5A, in the order from an object side to an image side, the optical image capturing system includes a first lens 510, an aperture 500, a second lens 520, a third lens 530, a fourth lens 540, a fifth lens 550, an infrared filter 570, an image plane 580 and an image sensing device 590.

An electronic device configured with the present embodiment may be provided with a light admitting opening 501 on the object side, wherein the light admitting opening 501 is configured to limit an optical path from the object side. The light admitting opening 501 has a diameter denoted as DDH, wherein DDH=1.978 mm. The light admitting opening 501 is at a distance of 0.2 mm away from a center of the first lens 510 (where the optical axis passes) on the object side.

The first lens 510 has negative refractive power and is made of glass material. The first lens 510 has a concave object-side surface 512 and a convex image-side surface 514, wherein both of the surfaces are aspheric.

The second lens 520 has positive refractive power and is made of plastic material. The second lens 520 has a convex object-side surface 522 and a convex image-side surface 524, wherein both of the surfaces are aspheric. The object-side surface 522 has one inflection point.

The third lens 530 has negative refractive power and is made of plastic material. The third lens 530 has a concave object-side surface 532 and a concave image-side surface 534, wherein both of the surfaces are aspheric. The object-side surface 532 has four inflection points and the image-side surface 534 has one inflection point.

The fourth lens 540 has positive refractive power and is made of plastic material. The fourth lens 540 has a concave object-side surface 542 and a convex image-side surface 544, wherein both of the surfaces are aspheric. The image-side surface 544 has one inflection point.

The fifth lens 550 has negative refractive power and is made of plastic material. The fifth lens 550 has a convex object-side surface 552 and a concave image-side surface 554, wherein both of the surfaces are aspheric. The object-side surface 552 has four inflection points and the image-side surface 554 has one inflection point. In this manner, the back focal length may be reduced to maintain a miniaturized optical image capturing system.

The infrared filter 570 is made of glass material and is configured between the fifth lens 550 and the image plane 580. The infrared filter 570 does not affect the focal length of the optical image capturing system.

Table 9 and Table 10 below should be incorporated into the reference of the present embodiment.

TABLE 9

Lens parameters of the fifth embodiment
f(focal length) = 2.5031 mm; f/HEP = 2.0; HAF(half angle of view) = 40.5408 deg

| Surface No. | | Curvature Radius | Thickness (mm) | Material | Refractive Index | Abbe No. | Focal Length |
|---|---|---|---|---|---|---|---|
| 0 | Object | 1E+18 | 1E+18 | | | | |
| 1 | Lens 1 | −5.594176229 | 0.560 | Aspheric glass | 1.755 | 27.58 | −23.611 |
| 2 | | −8.478964415 | 0.100 | | | | |
| 3 | Aperture | 1E+18 | 0.025 | | | | |
| 4 | Lens 2 | 1.645562557 | 0.462 | Plastic | 1.5365 | 55.885 | 1.633 |
| 5 | | −1.701020528 | 0.047 | | | | |
| 6 | Lens 3 | −11.4576968 | 0.332 | Plastic | 1.661 | 20.390 | −2.942 |
| 7 | | 2.394853104 | 0.637 | | | | |
| 8 | Lens 4 | −1.571461575 | 0.633 | Plastic | 1.5365 | 55.885 | 2.202 |
| 9 | | −0.770906897 | 0.032 | | | | |
| 10 | Lens 5 | 1.495494134 | 0.438 | Plastic | 1.5365 | 55.885 | −2.349 |
| 11 | | 0.614874898 | 0.460 | | | | |
| 12 | Infrared Filter | 1E+18 | 0.210 | BK_7 | 1.517 | 64.13 | |
| 13 | | 1E+18 | 0.470 | | | | |
| 14 | Image Plane | 1E+18 | 0.000 | | | | |

Reference wavelength = 555 nm; shield position: none

TABLE 10 aspheric coefficients of the fifth embodiment
Table 10: aspheric coefficients

| | Surface No. | | | | | | |
|---|---|---|---|---|---|---|---|
| | 1 | 2 | 4 | 5 | 6 | 7 | 8 |
| k | −1.876868E+01 | −2.365286E−04 | −9.000000E+01 | −9.000000E+01 | −9.000000E+01 | −3.718858E+01 | −1.091706E+01 |
| A4 | −7.098804E−02 | −1.355146E−01 | 1.872528E+00 | −6.646516E−01 | 7.487009E−01 | 4.073282E−01 | −2.621703E−01 |
| A6 | 1.803128E−02 | 8.343975E−02 | −2.008347E+01 | 1.998767E+00 | −7.212903E+00 | −2.635561E+00 | 2.090675E+00 |
| A8 | 0.000000E+00 | 0.000000E+00 | 1.697301E+02 | −8.206815E+00 | 3.764208E+01 | 1.473535E+01 | −1.870760E+01 |
| A10 | 0.000000E+00 | 0.000000E+00 | −1.062347E+03 | 2.037265E+01 | −1.328301E+02 | −6.279142E+01 | 9.423188E+01 |
| A12 | 0.000000E+00 | 0.000000E+00 | 4.528871E+03 | −3.027282E+01 | 3.219693E+02 | 1.808727E+02 | −2.976078E+02 |
| A14 | 0.000000E+00 | 0.000000E+00 | −1.260673E+04 | 2.593457E+01 | −5.061124E+02 | −3.298604E+02 | 5.851968E+02 |
| A16 | 0.000000E+00 | 0.000000E+00 | 2.173065E+04 | −1.133528E+01 | 4.839769E+02 | 3.646182E+02 | −7.005386E+02 |
| A18 | 0.000000E+00 | 0.000000E+00 | −2.095042E+04 | 0.000000E+00 | −2.531546E+02 | −2.230358E+02 | 4.694851E+02 |
| A20 | 0.000000E+00 | 0.000000E+00 | 8.605635E+03 | 0.000000E+00 | 5.494106E+01 | 5.778849E+01 | −1.350431E+02 |

| | Surface No. | | |
|---|---|---|---|
| | 9 | 10 | 11 |
| k | −9.629246E−01 | −5.151167E+01 | −5.139811E+00 |
| A4 | 4.775757E−01 | 4.424837E−01 | −5.921154E−03 |
| A6 | 2.088678E−02 | −1.531967E+00 | −1.000838E−01 |
| A8 | −2.654654E+00 | 2.720137E+00 | 1.159103E−01 |
| A10 | 6.190819E+00 | −3.169382E+00 | −8.205214E−02 |
| A12 | −6.132418E+00 | 2.351377E+00 | 3.436339E−02 |
| A14 | 9.852964E−01 | −1.082912E+00 | −8.530799E−03 |
| A16 | 2.939327E+00 | 2.999238E−01 | 1.329453E−03 |
| A18 | −2.135400E+00 | −4.599700E−02 | −1.390998E−04 |
| A20 | 4.396995E−01 | 3.026761E−03 | 7.991373E−06 |

In the fifth embodiment, the form of the aspheric surface equation therein is presented as that in the first embodiment. In addition, the definition of parameters in the following tables is equivalent to that in the first embodiment, so that the repetitive details are not stated here.

The following values for the conditional expressions may be obtained from the data in Table 9 and Table 10.

| Fifth embodiment (primary reference wavelength = 555 nm) | | | | | |
|---|---|---|---|---|---|
| ETP1 | ETP2 | ETP3 | ETP4 | ETP5 | BL |
| 0.564 | 0.265 | 0.416 | 0.553 | 0.546 | 1.1401 |
| ETP1/TP1 | ETP2/TP2 | ETP3/TP3 | ETP4/TP4 | ETP5/TP5 | EBL/BL |
| 1.007 | 0.574 | 1.252 | 0.874 | 1.247 | 0.8341 |
| ETL | EBL | EIN | EIR | PIR | EIN/ETL |
| 4.450 | 0.951 | 3.500 | 0.271 | 0.460 | 0.786 |
| SETP/EIN | EIR/PIR | SETP | STP | SETP/STP | SED/SIN |
| 0.670 | 0.588 | 2.345 | 2.425 | 0.967 | 1.313 |
| ED12 | ED23 | ED34 | ED45 | SED | SIN |
| 0.243 | 0.157 | 0.433 | 0.322 | 1.155 | 0.841 |
| ED12/IN12 | ED23/IN23 | ED34/IN34 | ED45/IN45 | | |
| 1.948 | 3.300 | 0.681 | 10.075 | | |
| \|f/f1\| | \|f/f2\| | \|f/f3\| | \|f/f4\| | \|f/f5\| | \|f1/f2\| |
| 0.10601 | 1.53302 | 0.85069 | 1.13676 | 1.06576 | 14.46076 |
| ΣPPR | ΣNPR | ΣPPR/\|ΣNPR\| | IN12/f | IN45/f | \|f2/f3\| |
| 3.7355 | 0.9567 | 3.9046 | 0.0499 | 0.0128 | 0.5549 |

-continued

| Fifth embodiment (primary reference wavelength = 555 nm) | | | | | |
|---|---|---|---|---|---|
| TP3/(IN23 + TP3 + IN34) | | (TP1 + IN12)/TP2 | | (TP5 + IN45)/TP4 | |
| 0.32689 | | 1.48407 | | 0.74186 | |
| HOS | InTL | HOS/HOI | InS/HOS | ODT % | TDT % |
| 4.40646 | 3.26637 | 1.91835 | 0.85017 | 2.16537 | 0.982561 |
| HVT11 | HVT12 | HVT21 | HVT22 | HVT31 | HVT32 |
| 0 | 0 | 0.641952 | 0 | 0.637472 | 0 |
| HVT41 | HVT42 | HVT51 | HVT52 | HVT52/HOI | HVT52/HOS |
| 0 | 0 | 0.88894 | 1.28507 | 0.38700 | 0.20174 |
| TP2/TP3 | TP3/TP4 | InRS51 | InRS52 | \|InRS51\|/TP5 | \|InRS52\|/TP5 |
| 1.38981 | 0.52460 | −0.075092 | 0.0821425 | 0.17148 | 0.18758 |
| MTFE0 | MTFE3 | MTFE7 | MTFQ0 | MTFQ3 | MTFQ7 |
| 0.78 | 0.72 | 0.46 | 0.59 | 0.48 | 0.18 |

The following values may be obtained according to the data in Table 9 and Table 10.

| Values related to inflection point of fifth embodiment (primary reference wavelength = 555 nm) | | | | | | | |
|---|---|---|---|---|---|---|---|
| HIF211 | 0.4381 | HIF211/HOI | 0.1907 | SGI211 | 0.0507 | \|SGI211\|/(\|SGI211\| + TP2) | 0.0990 |
| HIF311 | 0.1156 | HIF311/HOI | 0.0503 | SGI311 | −0.0005 | \|SGI311\|/(\|SGI311\| + TP3) | 0.0014 |
| HIF312 | 0.2518 | HIF312/HOI | 0.1096 | SGI312 | −0.0011 | \|SGI312\|/(\|SGI312\| + TP3) | 0.0032 |
| HIF313 | 0.5292 | HIF313/HOI | 0.2304 | SGI313 | −0.0059 | \|SGI313\|/(\|SGI313\| + TP3) | 0.0175 |
| HIF314 | 0.8681 | HIF314/HOI | 0.3779 | SGI314 | 0.0224 | \|SGI314\|/(\|SGI314\| + TP3) | 0.0631 |
| HIF321 | 0.8097 | HIF321/HOI | 0.3525 | SGI321 | 0.1250 | \|SGI321\|/(\|SGI321\| + TP3) | 0.2734 |
| HIF421 | 0.9577 | HIF421/HOI | 0.4169 | SGI421 | −0.4825 | \|SGI421\|/(\|SGI421\| + TP4) | 0.4324 |
| HIF511 | 0.5090 | HIF511/HOI | 0.2216 | SGI511 | 0.0601 | \|SGI511\|/(\|SGI511\| + TP5) | 0.1208 |
| HIF512 | 1.2317 | HIF512/HOI | 0.5362 | SGI512 | 0.0457 | \|SGI512\|/(\|SGI512\| + TP5) | 0.0944 |
| HIF513 | 1.3410 | HIF513/HOI | 0.5838 | SGI513 | 0.0139 | \|SGI513\|/(\|SGI513\| + TP5) | 0.0308 |
| HIF514 | 1.5565 | HIF514/HOI | 0.6776 | SGI514 | −0.0623 | \|SGI514\|/(\|SGI514\| + TP5) | 0.1245 |
| HIF521 | 0.5586 | HIF521/HOI | 0.2432 | SGI521 | 0.1609 | \|SGI521\|/(\|SGI521\| + TP5) | 0.2687 |

Sixth Embodiment

Figure 6A:
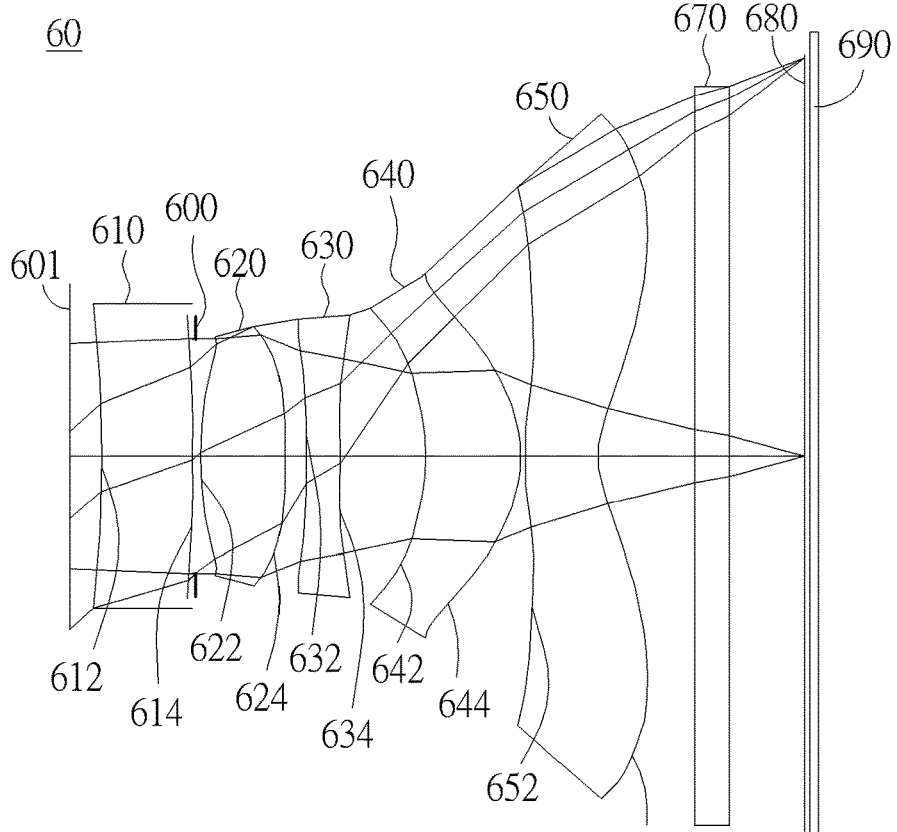
FIG. 6A is a schematic view of the optical image capturing system according to a sixth embodiment of the present disclosure.
Figure 6B:
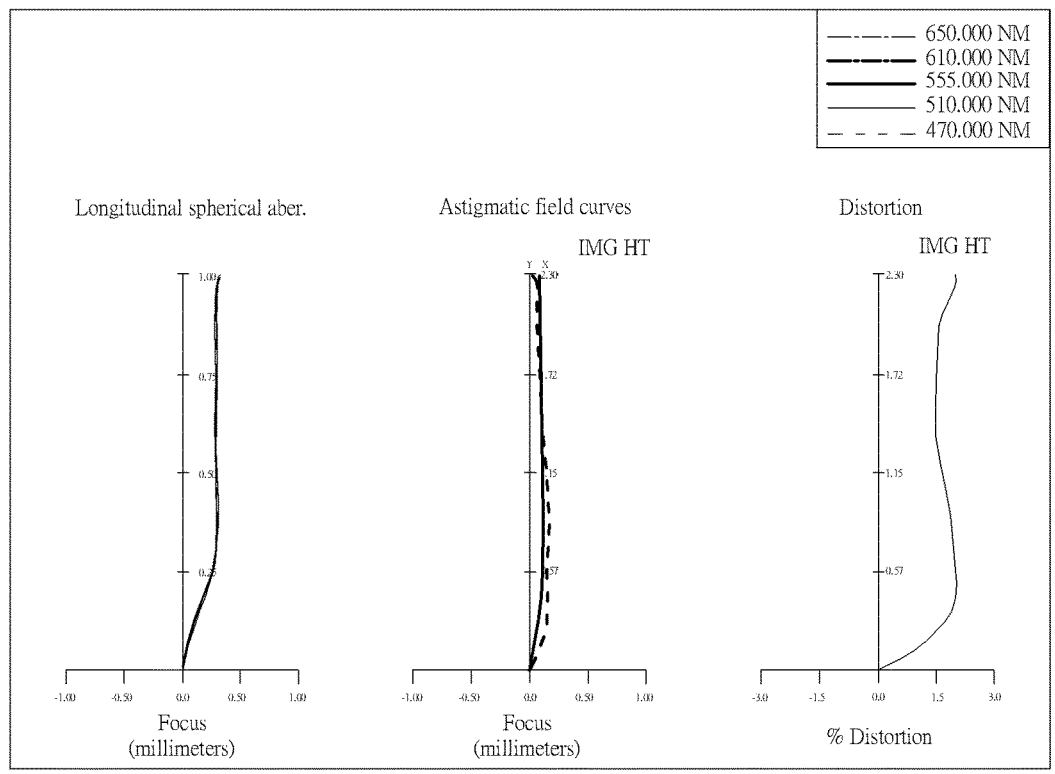
FIG. 6B is a curve diagram illustrating the spherical aberration, astigmatism and optical distortion of the optical image capturing system in the sequence from left to right according to the sixth embodiment of the present disclosure.
Figure 6C:
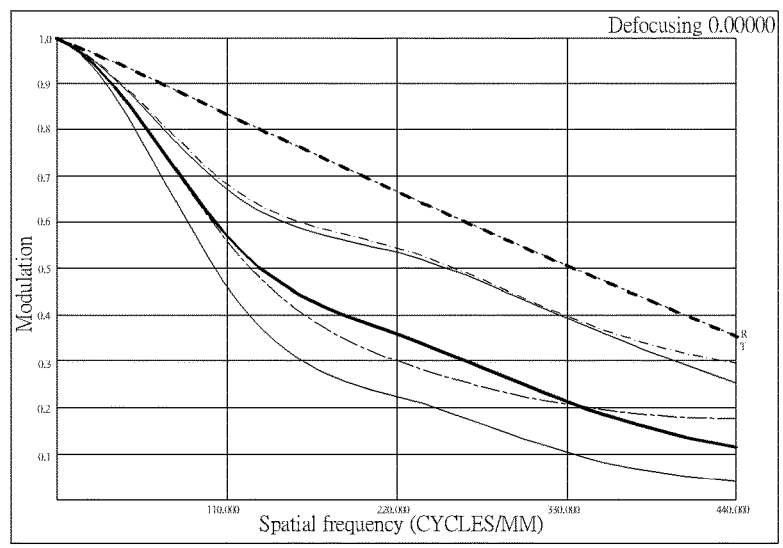
FIG. 6C is a characteristic diagram of modulation transfer of visible light spectrum according to the sixth embodiment of the present disclosure.
Figure 6C:
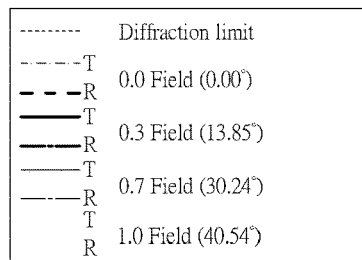

Please refer to FIGS. 6A and 6B, wherein FIG. 6A is a schematic view of the optical image capturing system according to the sixth embodiment of the present disclosure. FIG. 6B is a curve diagram illustrating the spherical aberration, astigmatism and optical distortion of the optical image capturing system in sequence from left to right according to the sixth embodiment of the present disclosure. FIG. 6C is a characteristic diagram of modulation transfer of visible light spectrum according to the sixth embodiment of the present disclosure. As shown in FIG. 6A, in the order from an object side to an image side, the optical image capturing system includes a first lens 610, an aperture 600, a second lens 620, a third lens 630, a fourth lens 640, a fifth lens 650, an infrared filter 670, an image plane 680 and an image sensing device 690.

An electronic device configured with the present embodiment may be provided with a light admitting opening 601 on the object side, wherein the light admitting opening 601 is configured to limit an optical path from the object side. The light admitting opening 601 has a diameter denoted as DDH, wherein DDH=1.990 mm. The light admitting opening 601 is at a distance of 0.2 mm away from a center of the first lens 610 (where the optical axis passes) on the object side.

The first lens 610 has negative refractive power and is made of glass material. The first lens 610 has a concave object-side surface 612 and a convex image-side surface 614, wherein both of the surfaces are aspheric.

The second lens 620 has positive refractive power and is made of plastic material. The second lens 620 has a convex object-side surface 622 and a convex image-side surface 624, wherein both of the surfaces are aspheric. The object-side surface 622 has one inflection point.

The third lens 630 has negative refractive power and is made of plastic material. The third lens 630 has a concave object-side surface 632 and a concave image-side surface 634, wherein both of the surfaces are aspheric. The object-side surface 632 has one inflection point.

The fourth lens 640 has positive refractive power and is made of plastic material. The fourth lens 640 has a concave object-side surface 642 and a convex image-side surface 644, wherein both of the surfaces are aspheric. The image-side surface 644 has one inflection point.

The fifth lens 650 has negative refractive power and is made of plastic material. The fifth lens 650 has a convex object-side surface 652 and a concave image-side surface 654, wherein both of the surfaces are aspheric. The object-side surface 652 has two inflection points and the image-side surface 654 has one inflection point. In this manner, the back focal length may be reduced to maintain a miniaturized optical image capturing system.

The infrared filter 670 is made of glass material and is configured between the fifth lens 650 and the image plane 680. The infrared filter 670 does not affect the focal length of the optical image capturing system.

Table 11 and Table 12 below should be incorporated into the reference of the present embodiment.

In the sixth embodiment, the form of the aspheric surface equation therein is presented as that in the first embodiment. Besides, the definition of parameters in the following tables is equivalent to that in the first embodiment, so that the repetitive details are not stated here.

The following values for the conditional expressions may be obtained from the data in Table 11 and Table 12.

TABLE 11

Lens Parameters for the Sixth Embodiment
f(focal length) = 2.4476 mm; f/HEP = 1.8; HAF (half angle of view) = 40.5682 deg.

| Surface No. | | Curvature Radius | Thickness (mm) | Material | Refractive Index | Abbe No. | Focal Length |
|---|---|---|---|---|---|---|---|
| 0 | Object | 1E+18 | 1E+18 | | | | |
| 1 | Lens 1 | −6.694582838 | 0.571 | Aspheric glass | 2.003 | 19.32 | −24.096 |
| 2 | | −9.623782959 | 0.025 | | | | |
| 3 | Aperture | −2.930849895 | 0.131 | | | | |
| 4 | Lens 2 | 1E+18 | 0.025 | Plastic | | | |
| 5 | | 1.528367026 | 0.529 | | 1.5365 | 55.885 | 1.947 |
| 6 | Lens 3 | −5.34092162 | 0.203 | Plastic | 1.661 | 20.390 | −4.784 |
| 7 | | 8.040637462 | 0.544 | | | | |
| 8 | Lens 4 | −1.298012193 | 0.597 | Plastic | 1.5365 | 55.885 | 1.801 |
| 9 | | −0.644157638 | 0.027 | | | | |
| 10 | Lens 5 | 1.597680361 | 0.453 | Plastic | 1.5365 | 55.885 | −1.827 |
| 11 | | 0.548321882 | 0.610 | | | | |
| 12 | Infrared Filter | 1E+18 | 0.210 | BK_7 | 1.517 | 64.13 | |
| 13 | | 1E+18 | 0.470 | | | | |
| 14 | Image Plane | 1E+18 | 0.000 | | | | |

Reference wavelength = 555 nm; shield position: none

TABLE 12 aspheric coefficients of the sixth embodiment
Table 12: aspheric coefficients

| | Surface No. | | | | | | |
|---|---|---|---|---|---|---|---|
| | 1 | 2 | 4 | 5 | 6 | 7 | 8 |
| k | −9.044133E−23 | −5.713909E−09 | −9.000000E+01 | −8.330177E+01 | −1.513747E+01 | −6.649363E+01 | −3.287111E+00 |
| A4 | −8.043064E−04 | −9.196910E−03 | 2.026362E+00 | −2.912307E−01 | 2.041411E−01 | 4.418261E−01 | −3.547404E−01 |
| A6 | 2.367477E−03 | 1.340740E−02 | −1.974181E+01 | −1.869392E+00 | −3.082029E+00 | −3.861099E+00 | 4.444994E+00 |
| A8 | 0.000000E+00 | 0.000000E+00 | 1.627476E+02 | 1.290515E+01 | 2.013391E+01 | 2.441548E+01 | −3.394105E+01 |
| A10 | 0.000000E+00 | 0.000000E+00 | −1.023964E+03 | −4.663202E+01 | −9.098444E+01 | −9.918220E+01 | 1.444317E+02 |
| A12 | 0.000000E+00 | 0.000000E+00 | 4.426399E+03 | 9.106810E+01 | 2.658655E+02 | 2.532997E+02 | −3.868489E+02 |
| A14 | 0.000000E+00 | 0.000000E+00 | −1.247059E+04 | −9.117070E+01 | −4.671382E+02 | −4.029924E+02 | 6.673131E+02 |
| A16 | 0.000000E+00 | 0.000000E+00 | 2.165703E+04 | 3.559271E+01 | 4.733703E+02 | 3.940411E+02 | −7.312506E+02 |
| A18 | 0.000000E+00 | 0.000000E+00 | −2.095042E+04 | 0.000000E+00 | −2.531546E+02 | −2.230358E+02 | 4.694851E+02 |
| A20 | 0.000000E+00 | 0.000000E+00 | 8.605635E+03 | 0.000000E+00 | 5.494106E+01 | 5.778849E+01 | −1.350431E+02 |

| | Surface No. | | |
|---|---|---|---|
| | 9 | 10 | 11 |
| k | −1.064208E+00 | −6.310036E+01 | −4.956088E+00 |
| A4 | 3.798561E−01 | 1.500451E−01 | −1.935023E−01 |
| A6 | 2.578672E−01 | −1.172410E+00 | 1.176491E−01 |
| A8 | −3.906413E+00 | 2.611753E+00 | −1.444130E−02 |
| A10 | 9.978588E+00 | −3.175916E+00 | −2.997057E−02 |
| A12 | −1.148022E+01 | 2.342247E+00 | 2.079095E−02 |
| A14 | 4.674854E+00 | −1.072562E+00 | −6.584757E−03 |
| A16 | 1.955602E+00 | 2.979851E−01 | 1.218456E−03 |
| A18 | −2.135400E+00 | −4.599700E−02 | −1.390998E−04 |
| A20 | 4.396995E−01 | 3.026761E−03 | 7.991373E−06 |

| Sixth embodiment (primary reference wavelength = 555 nm) | | | | | |
|---|---|---|---|---|---|
| ETP1 | ETP2 | ETP3 | ETP4 | ETP5 | BL |
| 0.580 | 0.315 | 0.289 | 0.490 | 0.592 | 1.2898 |
| ETP1/TP1 | ETP2/TP2 | ETP3/TP3 | ETP4/TP4 | ETP5/TP5 | EBL/BL |
| 1.016 | 0.595 | 1.426 | 0.822 | 1.306 | 0.8536 |
| ETL | EBL | EIN | EIR | PIR | EIN/ETL |
| 4.425 | 1.101 | 3.324 | 0.421 | 0.610 | 0.751 |
| SETP/EIN | EIR/PIR | SETP | STP | SETP/STP | SED/SIN |
| 0.681 | 0.690 | 2.265 | 2.352 | 0.963 | 1.409 |
| ED12 | ED23 | ED34 | ED45 | SED | SIN |
| 0.169 | 0.203 | 0.333 | 0.353 | 1.059 | 0.751 |
| ED12/IN12 | ED23/IN23 | ED34/IN34 | ED45/IN45 | | |
| 3.389 | 1.554 | 0.612 | 13.302 | | |
| $|f/f1|$ | $|f/f2|$ | $|f/f3|$ | $|f/f4|$ | $|f/f5|$ | $|f1/f2|$ |
| 0.10158 | 1.25701 | 0.51163 | 1.35915 | 1.33972 | 12.37469 |
| ΣPPR | ΣNPR | ΣPPR/|ΣNPR| | IN12/f | IN45/f | $|f2/f3|$ |
| 3.1084 | 1.4607 | 2.1280 | 0.0204 | 0.0109 | 0.4070 |
| TP3/(IN23 + TP3 + IN34) | | (TP1 + IN12)/TP2 | | (TP5 + IN45)/TP4 | |
| 0.23081 | | 1.17248 | | 0.80378 | |
| HOS | InTL | HOS/HOI | InS/HOS | ODT % | TDT % |
| 4.39329 | 3.10349 | 1.91262 | 0.86442 | 2.1677 | 0.621245 |
| HVT11 | HVT12 | HVT21 | HVT22 | HVT31 | HVT32 |
| 0 | 0 | 0.659821 | 0 | 0.750397 | 0 |
| HVT41 | HVT42 | HVT51 | HVT52 | HVT52/HOI | HVT52/HOS |
| 0 | 0 | 0.74654 | 1.29105 | 0.32501 | 0.16993 |
| TP2/TP3 | TP3/TP4 | InRS51 | InRS52 | |InRS51|/TP5 | |InRS52|/TP5 |
| 2.61387 | 0.33946 | −0.03765 | 0.108718 | 0.08312 | 0.24002 |
| MTFE0 | MTFE3 | MTFE7 | MTFQ0 | MTFQ3 | MTFQ7 |
| 0.68 | 0.57 | 0.46 | 0.55 | 0.36 | 0.23 |

The following values may be obtained according to the data in Table 11 and Table 12.

| Values related to inflection point of sixth embodiment (primary reference wavelength = 555 nm) | | | | | | | |
|---|---|---|---|---|---|---|---|
| HIF211 | 0.4820 | HIF211/HOI | 0.2098 | SGI211 | 0.0665 | |SGI211|/(|SGI211| + TP2) | 0.1116 |
| HIF311 | 0.5699 | HIF311/HOI | 0.2481 | SGI311 | −0.0350 | |SGI311|/(|SGI311| + TP3) | 0.1473 |
| HIF421 | 0.8692 | HIF421/HOI | 0.3784 | SGI421 | −0.4739 | |SGI421|/(|SGI421| + TP4) | 0.4427 |
| HIF511 | 0.3416 | HIF511/HOI | 0.1487 | SGI511 | 0.0253 | |SGI511|/(|SGI511| + TP5) | 0.0529 |
| HIF512 | 1.4580 | HIF512/HOI | 0.6347 | SGI512 | −0.0236 | |SGI512|/(|SGI512| + TP5) | 0.0494 |
| HIF521 | 0.4180 | HIF521/HOI | 0.1820 | SGI521 | 0.1079 | |SGI521|/(|SGI521| + TP5) | 0.1923 |

Although the present disclosure is disclosed via the aforementioned embodiments, those embodiments do not serve to limit the scope of the present disclosure. A person skilled in the art may perform various alterations and modifications to the present disclosure without departing from the spirit and the scope of the present disclosure. Hence, the scope of the present disclosure should be defined by the following appended claims.

Despite the fact that the present disclosure is specifically presented and illustrated with reference to the exemplary embodiments thereof, it should be obvious to a person skilled in the art that, various modifications to the forms and details of the present disclosure may be performed without departing from the scope and spirit of the present disclosure defined by the following claims and equivalents thereof.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical image capturing system, from an object side to an image side, comprising:
   a first lens with refractive power;
   a second lens with refractive power;
   a third lens with refractive power;
   a fourth lens with refractive power;
   a fifth lens with refractive power; and
   an image plane;
   wherein the optical image capturing system comprises five lenses with refractive power, at least one of the first lens, the second lens, the third lens, the fourth lens and the fifth lens has positive refractive power, the first lens is made of glass materials, at least one of the second lens, the third lens, the fourth lens and the fifth lens is made of plastic materials, a focal length of the first lens, the second lens, the third lens, the fourth lens, and the fifth lens is denoted as f1, f2, f3, f4 and f5 respectively, a focal length of the optical image capturing system is denoted as f, an entrance pupil diameter of the optical image capturing system is denoted as HEP, a distance on an optical axis from an object-side surface of the first lens to the image plane is denoted as HOS, a distance on the optical axis from the object-side surface of the first lens to an image side surface of the fifth lens is denoted as InTL, the optical image capturing system has a maximum image height HOI on the image plane perpendicular to the optical axis, thicknesses at ½ HEP height and parallel to the optical axis of the first lens, the second lens, the third lens, the fourth lens and the fifth lens are denoted as ETP1, ETP2, ETP3, ETP4 and ETP5 respectively, a sum of the ETP1 to ETP5 described above is denoted as SETP, thicknesses on the optical axis of the first lens, the second lens, the third lens, the fourth lens and the fifth lens are denoted as TP1, TP2, TP3, TP4 and TP5 respectively, a sum of the TP1 to TP5 described above is denoted as STP, the first lens has a refractive index denoted as Nd1, and conditions as follows are satisfied: $1.0 \le f/HEP \le 10$, $0.5 \le HOS/f \le 3$, $0.5 \le SETP/STP < 1$, and $1.70 \le Nd1 \le 3.0$.

2. The optical image capturing system of claim 1, wherein half of a maximum angle of view of the optical image capturing system is denoted as HAF, and a condition as follows is satisfied: $0 \text{ deg} < HAF \le 50 \text{ deg}$.

3. The optical image capturing system of claim 1, wherein the second lens, the third lens, the fourth lens, and the fifth lens are made of plastic materials.

4. The optical image capturing system of claim 1, wherein a central thickness of the first lens is denoted as TP1, and a condition as follows is satisfied: $0.5 \text{ mm} \le TP1 \le 0.9 \text{ mm}$.

5. The optical image capturing system of claim 1, wherein a horizontal distance parallel to the optical axis between a coordinate point at ½ HEP height on the object-side surface of the first lens to the image plane is denoted as ETL, a horizontal distance parallel to the optical axis between a coordinate point at ½ HEP height on the object-side surface of the first lens to a coordinate point at ½ HEP height on the image-side surface of the fifth lens is denoted as EIN, and a condition as follows is satisfied: $0.2 \le EIN/ETL < 1$.

6. The optical image capturing system of claim 5, wherein thicknesses at ½ HEP height and parallel to the optical axis of the first lens, the second lens, the third lens, the fourth lens and the fifth lens are denoted as ETP1, ETP2, ETP3, ETP4 and ETP5 respectively, a sum of the ETP1 to ETP5 described above is denoted as SETP, and a condition as follows is satisfied: $0.2 \le SETP/EIN < 1$.

7. The optical image capturing system of claim 1, wherein modulation transfer rates (values of MTF) for the visible light at a spatial frequency of 110 cycles/mm at positions of the optical axis, 0.3 HOI and 0.7 HOI on the image plane are denoted as MTFQ0, MTFQ3 and MTFQ7 respectively, and conditions as follows are satisfied: $MTFQ0 \ge 0.2$, $MTFQ3 \ge 0.01$, and $MTFQ7 \ge 0.01$.

8. The optical image capturing system of claim 1, further comprising an aperture, wherein a distance from the aperture to the image plane on the optical axis is defined as InS, and a condition as follows is satisfied: $0.2 \le InS/HOS \le 1.1$.

9. An optical image capturing system, from an object side to an image side, comprising:
   a first lens made of glass materials, the first lens having a flat object-side surface and a flat image-side surface;
   a second lens with refractive power;
   a third lens with refractive power;
   a fourth lens with refractive power;
   a fifth lens with refractive power; and
   an image plane;
   wherein the optical image capturing system comprises five lenses with refractive power, at least one of the first lens, the second lens, the third lens, the fourth lens and the fifth lens has positive refractive power, the second lens through the fifth lens are made of plastic materials, a focal length of the first lens, the second lens, the third lens, the fourth lens, and the fifth lens is denoted as f1, f2, f3, f4 and f5 respectively, a focal length of the optical image capturing system is denoted as f, an entrance pupil diameter of the optical image capturing system is denoted as HEP, a distance on an optical axis from an object-side surface of the first lens to the image plane is denoted as HOS, a distance on the optical axis from the object-side surface of the first lens to an image side surface of the fifth lens is denoted as InTL, the optical image capturing system has a maximum image height HOI on the image plane perpendicular to the optical axis, a horizontal distance parallel to the optical axis between a coordinate point at ½ HEP height on the object-side surface of the first lens to the image plane is denoted as ETL, a horizontal distance parallel to the optical axis between a coordinate point at ½ HEP height on the object-side surface of the first lens to a coordinate point at ½ HEP height on the image-side surface of the fifth lens is denoted as EIN, and conditions as follows are satisfied: $1.0 \le f/HEP \le 10$, $0.5 \le HOS/f \le 3$, and $0.2 \le EIN/ETL < 1$.

10. The optical image capturing system of claim 9, wherein half of a maximum angle of view of the optical image capturing system is denoted as HAF, and a condition as follows is satisfied: $0 \text{ deg} < HAF \le 50 \text{ deg}$.

11. The optical image capturing system of claim 9, wherein central thicknesses of the first lens and the third lens are denoted as TP1 and TP3 respectively, and a condition as follows is satisfied: $TP1 > TP3$.

12. The optical image capturing system of claim 9, wherein a distance between the third lens and the fourth lens on the optical axis is denoted as IN34, and a condition as follows is satisfied: 0.5 mm≤IN34≤0.7 mm.

13. The optical image capturing system of claim 9, wherein a distance between the third lens and the fourth lens on the optical axis is denoted as IN34, a distance between the fourth lens and the fifth lens on the optical axis is denoted as IN45, and a condition as follows is satisfied: IN34>IN45.

14. The optical image capturing system of claim 9, wherein the optical image capturing system satisfies a condition as follows: f2>f3.

15. The optical image capturing system of claim 9, wherein a horizontal distance in parallel with the optical axis from a coordinate point on the image-side surface of the fifth lens at the height of ½ HEP to the image plane is denoted as EBL, a horizontal distance in parallel with the optical axis from the intersection point of the optical axis and the image-side surface of the fifth lens to the image plane is denoted as BL, and a condition as follows is satisfied: 0.2≤EBL/BL<1.1.

16. The optical image capturing system of claim 9, wherein the optical image capturing system comprises a light filtering element, the light filtering element being is located between the fifth lens and the image plane, a distance in parallel with the optical axis from a coordinate point on the image-side surface of the fifth lens at height of ½ HEP to the light filtering element is denoted as EIR, a distance in parallel with the optical axis from an intersection point of the optical axis and the image-side surface of the fifth lens to the light filtering element is denoted as PIR, and a condition as follows is satisfied: 0.1≤EIR/PIR<1.0.

17. The optical image capturing system of claim 9, wherein the optical image capturing system has a maximum image height HOI on the image plane perpendicular to the optical axis, modulation transfer rates (values of MTF) for the visible light at a spatial frequency of 220 cycles/mm at positions of the optical axis, 0.3 HOI and 0.7 HOI on the image plane are denoted as MTFH0, MTFH3 and MTFH7 respectively, and conditions as follows are satisfied: MTFH0≥0.2, MTFH3≥0.01, and MTFH7≥0.01.

18. The optical image capturing system of claim 9, wherein at least one of the first lens, the second lens, the third lens, the fourth lens and the fifth lens may be set as a light filtering element capable of filtering wavelengths less than 500 nm.

19. An optical image capturing system, from an object side to an image side, comprising:
a light admitting opening for limiting an optical path from the object side, the light admitting opening having a diameter denoted as DDH;
a first lens made of glass materials, the first lens having a flat object-side surface and a flat image-side surface;
a second lens with refractive power;
a third lens with refractive power;
a fourth lens with refractive power;
a fifth lens with refractive power; and
an image plane;
wherein at least one of the second lens, the third lens, the fourth lens and the fifth lens has positive refractive power, the second lens, the third lens, the fourth lens and the fifth lens are made of plastic materials, a focal length of the first lens, the second lens, the third lens, the fourth lens, and the fifth lens is denoted as f1, f2, f3, f4 and f5 respectively, a focal length of the optical image capturing system is denoted as f, an entrance pupil diameter of the optical image capturing system is denoted as HEP, a distance on an optical axis from an object-side surface of the first lens to the image plane is denoted as HOS, a distance on the optical axis from the object-side surface of the first lens to an image side surface of the fifth lens is denoted as InTL, the optical image capturing system has a maximum image height HOI on the image plane perpendicular to the optical axis, the optical image capturing system has a maximum image height HOI on the image plane perpendicular to the optical axis, a horizontal distance parallel to the optical axis between a coordinate point at ½ HEP height on the object-side surface of the first lens to the image plane is denoted as ETL, a horizontal distance parallel to the optical axis between a coordinate point at ½ HEP height on the object-side surface of the first lens to a coordinate point at ½ HEP height on the image-side surface of the fifth lens is denoted as EIN, and conditions as follows are satisfied: 1.0≤f/HEP≤10, 0.5≤HOS/f≤3, 0 mm<DDH≤10 mm, and 0.2≤EIN/ETL<1.

20. The optical image capturing system of claim 19, wherein half of a maximum angle of view of the optical image capturing system is denoted as HAF, and a condition as follows is satisfied: 0 deg<HAF≤50 deg.

21. The optical image capturing system of claim 19, wherein a distance on the optical axis between a center of the light admitting opening and a center of the first lens on the object side is denoted as d, and a condition as follows is satisfied: d≤1 mm.

22. The optical image capturing system of claim 19, wherein the first lens has a refractive index denoted as Nd1, and a condition as follows is satisfied: 1.70≤Nd1≤3.0.

23. The optical image capturing system of claim 19, wherein a central thickness of the first lens is denoted as TP1, and a condition as follows is satisfied: 0.5 mm≤TP1≤0.9 mm.

24. The optical image capturing system of claim 19, further comprising an aperture, an image sensing device, and a driving module, wherein the image sensing device is configured at the image plane, a distance from the aperture to the image plane on the optical axis is denoted as InS, the driving module may be coupled with the five lenses so as to displace the five lenses, and a condition as follows is satisfied: 0.2≤InS/HOS≤1.1.

* * * * *